(12) United States Patent
Miyauchi

(10) Patent No.: US 12,077,644 B2
(45) Date of Patent: Sep. 3, 2024

(54) AMIDE ACID OLIGOMER PROCESS FOR MOLDING POLYIMIDE COMPOSITES

(71) Applicant: Kaneka Americas Holding, Inc., Pasadena, TX (US)

(72) Inventor: Masahiko Miyauchi, Pasadena, TX (US)

(73) Assignee: Kaneka Americas Holding, Inc., Pasadena, TX (US)

( * ) Notice: Subject to any disclaimer, the term of this patent is extended or adjusted under 35 U.S.C. 154(b) by 527 days.

(21) Appl. No.: 17/282,256

(22) PCT Filed: Oct. 2, 2019

(86) PCT No.: PCT/US2019/054286
§ 371 (c)(1),
(2) Date: Apr. 1, 2021

(87) PCT Pub. No.: WO2020/072639
PCT Pub. Date: Apr. 9, 2020

(65) Prior Publication Data
US 2021/0340344 A1    Nov. 4, 2021

Related U.S. Application Data

(60) Provisional application No. 62/740,149, filed on Oct. 2, 2018.

(51) Int. Cl.
*C08J 5/04* (2006.01)
*B32B 5/26* (2006.01)
(Continued)

(52) U.S. Cl.
CPC ............. *C08J 5/243* (2021.05); *B32B 5/26* (2013.01); *B32B 27/281* (2013.01);
(Continued)

(58) Field of Classification Search
CPC ........ C08J 5/243; C08J 5/042; C08J 2379/08; C08J 2333/24; C08J 5/04; C08J 5/24;
(Continued)

(56) References Cited

U.S. PATENT DOCUMENTS 3,632,554 A    1/1972    Kubota
4,454,310 A    6/1984    Oka et al.
(Continued)

FOREIGN PATENT DOCUMENTS

CN        106661225 A      5/2017
JP        2008-001791 A    1/2008
(Continued)

OTHER PUBLICATIONS

Miyauchi M, Ishida Y, Ogasawara T, Yokota R. Highly soluble phenylethynyl-terminated imide oligomers based on KAPTON-type backbone structures for carbon fiber-reinforced composites with high heat resistance. Polymer journal. Jun. 2013;45(6):594-600.

(Continued)

*Primary Examiner* — John D Freeman
(74) *Attorney, Agent, or Firm* — Lerner David LLP

(57) ABSTRACT

An amide acid oligomer (AAO) solution, methods of making the same, powder, AAO solution prepregs, AAO dry prepreg, imide prepregs, and fiber reinforced polyimide composites with high temperature resistance and excellent mechanical properties are disclosed herein. In some embodiments, a method of making an AAO solution includes dissolving an aromatic diamine and an aromatic tetracarboxylic compound in a solvent to form a mixture, wherein the solvent has a boiling point of less than 150° C.; stirring the mixture at a temperature ranging from about 5° C. to about 60° C. for about 1 hour to about 24 hours to form a reaction solution; adding unsaturated acid anhydride to the reaction solution; and stirring the reaction solution at a (Continued)

temperature ranging from about 5° C. to about 60° C. for about 1 minute to about 180 minutes to form an amide acid oligomer solution, the amide acid oligomer solution having amide acid oligomer in the solvent.

15 Claims, 16 Drawing Sheets

(51) Int. Cl.
*B32B 27/28* (2006.01)
*C08G 73/10* (2006.01)
*C08G 73/12* (2006.01)
*C08J 5/24* (2006.01)

(52) U.S. Cl.
CPC ..... *C08G 73/1032* (2013.01); *C08G 73/1071* (2013.01); *C08G 73/122* (2013.01); *C08J 5/042* (2013.01); B32B 2260/023 (2013.01); B32B 2260/046 (2013.01); B32B 2262/106 (2013.01); B32B 2305/076 (2013.01); B32B 2307/542 (2013.01); B32B 2307/558 (2013.01); C08J 2379/08 (2013.01)

(58) Field of Classification Search
CPC ............... B32B 5/26; B32B 2260/023; B32B 2260/046; B32B 2262/106; B32B 2262/101; B32B 5/026; B32B 2262/0261; B32B 2262/103; B32B 2262/105; B32B 2307/542; B32B 2307/558; B32B 2605/18; B32B 5/02; B32B 5/024; B32B 27/20; B32B 2305/076; B32B 27/281; C08G 73/1071; C08G 69/26; C08G 73/1028; C08G 73/1032; C08G 73/122
See application file for complete search history.

(56) References Cited

U.S. PATENT DOCUMENTS

| | | | |
|---|---|---|---|
| 5,138,028 | A | 8/1992 | Paul et al. |
| 6,281,323 | B1 | 8/2001 | Yokota et al. |
| 2009/0220826 | A1 | 9/2009 | Wang |
| 2011/0165809 | A1* | 7/2011 | Miyauchi ............ C08J 5/243 |
| | | | 525/426 |
| 2014/0135448 | A1 | 5/2014 | Rome et al. |
| 2017/0152399 | A1 | 6/2017 | Miyauchi et al. |

FOREIGN PATENT DOCUMENTS

| | | |
|---|---|---|
| JP | 2014-509674 A | 4/2014 |
| WO | 2010027020 A1 | 3/2010 |

OTHER PUBLICATIONS

International Search Report for PCT/US/19/54286 mailed Jan. 6, 2020.

Xiaochen Li, et al., "Thermal Oxidation of PEPA-terminated polymide," High Performance Polymers, 1-12, Jul. 2018, pp. 1-13.

* cited by examiner

AMIDE ACID OLIGOMER PROCESS FOR MOLDING POLYIMIDE COMPOSITES

CROSS-REFERENCE TO RELATED APPLICATIONS

The present application is a national phase entry under 35 U.S.C. § 371 of International Application No. PCT/US2019/054286, filed Oct. 2, 2019, which claims priority from U.S. Provisional Application No. 62/740,149, filed on Oct. 2, 2018, and entitled NOVEL AMIDE ACID OLIGOMER PROCESS FOR MOLDING POLYIMIDE COMPOSITES, the disclosure of which is hereby incorporated herein by reference.

TECHNICAL FIELD

The present invention relates to an amide acid oligomer (AAO) solution, methods of making the same, powder, AAO solution prepregs, AAO dry prepreg, imide prepregs, and fiber reinforced polyimide composites with high temperature resistance and excellent mechanical properties prepared from the same.

BACKGROUND OF THE INVENTION

Conventional prepregs for polyimide composites typically involve high polar and high boiling point solvents including gamma-butyrolactone ("g-BL", boiling point, about 204° C.) dimethylacetoamide ("DMAc", boiling point: about 165° C.) and N-Methyl-2-pyrrolidone ("NMP", boiling point: about 202° C.) or diamines, which may be considered toxic.

Carbon fiber (CF) reinforced polyimide composites have been used as light-weight materials in place of titanium alloys in high temperature applications, such as, e.g. aerospace engine components. Over the last 30 years, many thermosetting polyimides have been developed to be used as matrix resins in advanced composite materials for aerospace applications. However, the practical applications have been very limited in aircraft due to the difficulty of establishing both high temperature durability and high mechanical properties of the polyimide composites.

As shown in FIG. 1, a highly-concentrated NMP solution (30 wt %) of phenylethynyl terminated imide oligomers derived from pyromellitic dianhydride ("PMDA"), 2-phenyl-4,4'-diaminodiphenyl ether ("ph-ODA") and phenylethynylphthalic anhydride ("PEPA") was disclosed in U.S. patent application Ser. No. 13/062,132 and U.S. Pat. No. 8,846,532 (hereinafter referred to as "Miyauchi et al"). The imide oligomer solution was synthesized using a solution imidization method of the monomers in NMP solvent at about 200° C. through formation of the corresponding amide acid oligomer. The imide oligomer powder after being prepared by reprecipitation into water, methanol wash and vacuum dried, showed a very good melt flowability at high temperature at higher than 250° C., followed by successfully converting to the cured polyimide resins by crosslinking and chain extension of PEPA-end terminal groups of the imide oligomer using a hot press machine at about 370° C. for 1 hour. The cured imide resin showed a Tg at higher than 340° C. and excellent elongation at break higher than 15%.

Furthermore, Miyauchi et al. successfully prepared a wet prepreg (NMP solution prepreg) composed of NMP solution of imide oligomer and carbon fiber by impregnation of the carbon fiber through a dipping process involving the NMP solution of the imide oligomer. However, it was very difficult to completely remove the NMP solvent from the stacked prepregs especially with more than 30 plies while they were being molded to make composite panels. This is because the NMP solvent has a very high boiling point and very high intermolecular interaction between the imide groups in the imide oligomers and the NMP solvent molecule with high polarity. As a result, the NMP solvent remaining in the molded composite panels decreases the heat resistance and the mechanical characteristics of the molded composites by plasticizing and softening the polyimide matrix resin.

A wet prepreg composed of NMP solution of amide acid oligomer and carbon fiber prepared by impregnation was disclosed in U.S. Pat. No. 6,281,323. However, it was also very difficult to completely remove the NMP solvent from the stacked prepregs. Furthermore, the water by-product generated by the imidization reaction of the amide acid oligomer was easily absorbed in the NMP solvent in the prepreg, followed by remaining in the prepreg with a good compatibility with NMP solvent. The water by-product in the prepreg resulted in generating voids in the composites after being vaporized at high temperature. Voids involved in composites as defects generally cause a reduction of mechanical properties.

In order to solve these problems above Miyauchi et al. developed an alternative process using raw materials ("monomers") and solvents having a boiling point less than 150° C. to mold the composite panels. Varnish prepared by PMDA diesters, PEPA mono-ester, ph-ODA, and solvents including 1,4-dioxane (boiling point: 101° C.) or alcohols (FIG. 2) using an in-situ polymerization method of monomer reactants ("PMR") were disclosed as a monomer solution for the wet prepreg in U.S. Pat. No. 10,047,246. As a result, the composite panels were also successfully molded using the monomer solution prepregs without residual solvents inside. Furthermore, PCT/US2019/33300, filed May 21, 2019, which claims priority from U.S. Provisional Patent No. 62/674,298, filed on May 21, 2018, the contents of which are incorporated herewith is directed to fabric composites molded using prepregs composed of monomers, alcohol solvents, and fibers (PMR prepregs), which showed no significant internal damage after thermal cycles in the temperature range between −54 and 232° C. after 2000 times. However, other PMR prepregs invented so far have been also generally considered as toxic substances due to the existence of monomers inside, especially diamines which possibly have mutagenicity or allergens. Accordingly, there was a necessity to develop an alternative prepreg that does not include any monomers. Furthermore, prepreg solvents with low boing points needed to be used for the complete removal in the molding process of composites. Also, methanol (having a low boiling point of about 65° C.) and ethanol (having a low boiling point of about 78° C.) solvents used in PMR prepregs are easily evaporated during storage even if in the freezer, due to their low boiling points and high vapor pressure. As a result, the tackiness and drapability of PMR prepregs were easily lowered by evaporation of solvent. Furthermore, it was extremely difficult to lay up the partially or completely dried PMR prepregs to mold composites, especially with complicated shapes.

BRIEF SUMMARY OF THE INVENTION

In order to solve these issues, the present invention provides alternative low toxicity prepregs, which involve an amide acid oligomer ("AAO") and specific modified alcohol solvents or mixture solvents composed of organic solvents and alcohols. These solvents have boiling points of less than 150° C. (FIG. 3). The inventors discovered that limited quantities of residual monomers less than about 5% for the entire quantity of obtained AAO powder detected by Gel Permeation Chromatography were found to be involved in the AAO solution and the prepregs of the present invention. In addition, the inventors found that AAO solutions of the present invention have several of the following benefits. First, the cured imide resins prepared using the inventive AAO process showed a higher elongation-at-break in comparison with the conventional methods. Second, AAO prepregs of the present invention have better long-term storage stability to keep the adhesiveness or tackiness of the prepreg to adhere closely to each other for the lay-up. This benefit also permits the user to more easily lay-up AAO prepregs while removing air between prepregs prior to the molding process in comparison to the conventional PMR prepregs, which use only pure alcohols such as methanol, ethanol and propanol. Third, the low boiling solvent can be easily removed from the stacked AAO prepregs during the composite molding as well as PMR prepreg, but much easier than NMP solution prepreg. Finally, the molded polyimide composites made via the inventive AAO prepregs showed a high short beam shear strength that was comparable to the previously known methods, regardless of the type of the prepreg.

The present disclosure describes a method comprising: dissolving an aromatic diamine and an aromatic tetracarboxylic compound in a solvent to form a mixture, wherein the solvent has a boiling point of less than 150° C.; stirring the mixture at a temperature ranging from about 5° C. to about 60° C. for about 1 hour to about 24 hours to form a reaction solution; adding unsaturated acid anhydride to the reaction solution; and stirring the reaction solution at a temperature ranging from about 5° C. to about 60° C. for about 1 minute to about 180 minutes to form an amide acid oligomer solution, the amide acid oligomer solution having the amide acid oligomer in the solvent. Also described herein is an amide acid oligomer powder prepared by removing the solvent from the amide acid oligomer solution, and pulverizing the amide acid oligomer to form an amide acid oligomer powder.

Also described herein is an imide oligomer powder prepared by heat treating the amide acid oligomer powder.

Also described herein is a cured imide resin prepared by heating treating the amide acid oligomer powder.

Also described herein is a cured imide resin prepared by heating treating the imide oligomer powder.

Also described herein is an amide acid oligomer powder having a complex viscosity higher than $10^4$ Pa·s over a temperature range of about 25° C. to about 250° C.

Also described herein is a fiber-reinforced composite material prepared by stacking at least one of a plurality of prepregs, a plurality of imide prepregs, or a combination of prepregs and imide prepregs, and thermally curing the stack, wherein a prepreg including a fiber impregnated by the amide acid oligomer solution, and wherein an imide prepreg is prepared by heating the prepreg to covert the amide acid oligomer into an imide oligomer.

Also described herein is a prepreg comprising a fiber impregnated by the amide acid oligomer solution.

Also described herein is an imide prepreg comprising a fiber impregnated by the amide acid oligomer solution and then heat treated to covert the amide acid oligomer into an imide oligomer.

DETAILED DESCRIPTION

The present invention is directed to AAO solution using low boiling point solvents, methods of making the same, AAO powders, AAO solution prepregs, AAO dry prepreg, imide oligomers, cured imide resins, imide prepregs, and fiber reinforced polyimide composites with high temperature resistance prepared from the same. The solutions and methods disclosed herein advantageously involve impregnation of limited quantity of residue of monomers into fibers for the preparation of prepregs. These methods also enable the neat cured resins to have a high strain without sacrificing glass transition temperature ("Tg") in comparison with the conventional methods. Furthermore, the fiber-reinforced polyimide composites showed a higher short beam shear ("SBS") strength at room temperature.

Figure 1:
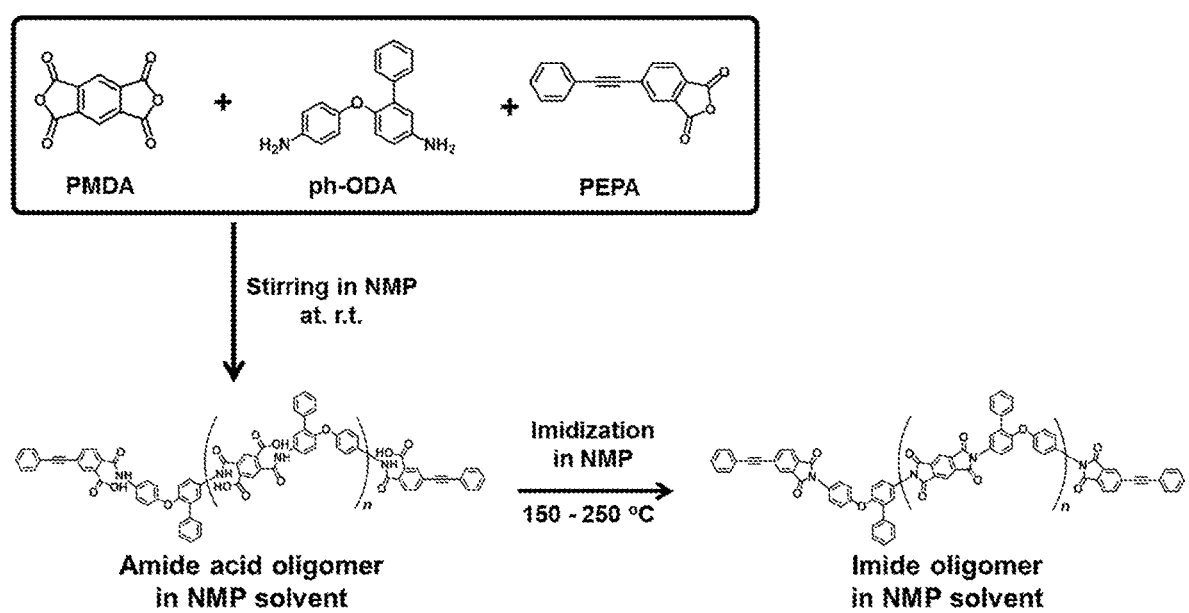
FIG. 1 represents a reaction scheme of the conventional synthetic route of imide oligomers through a solution imidization method using an N-methylpyrrolidone solvent.
Figure 2:
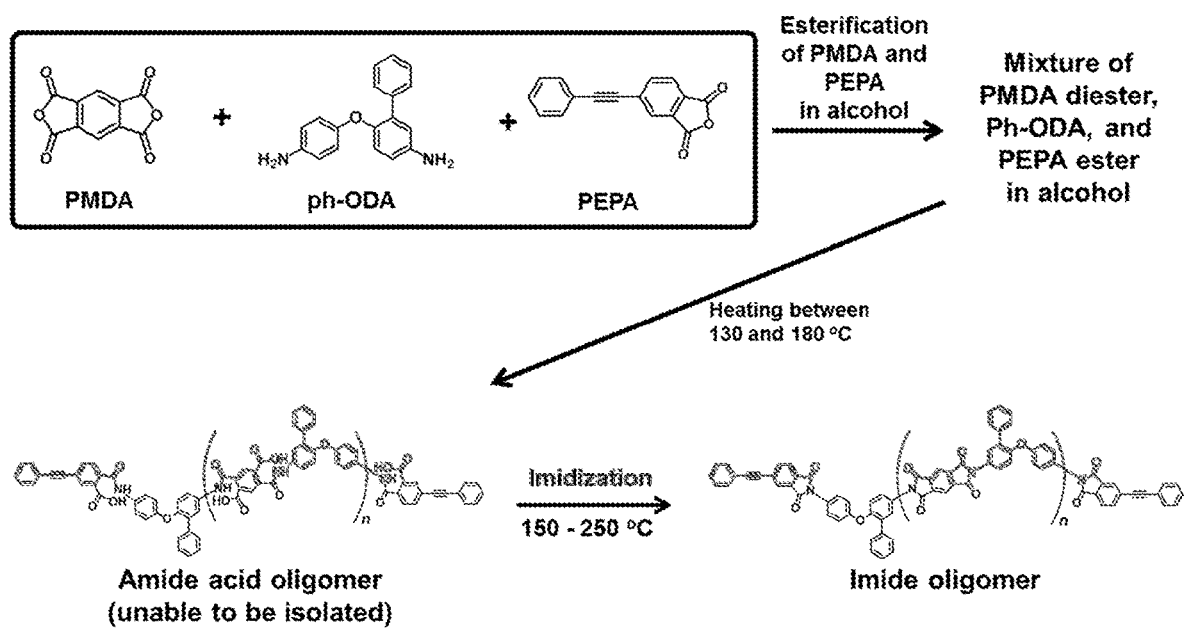
FIG. 2 represents a reaction scheme of a conventional synthetic route of imide oligomers through an in situ polymerization of monomer reactant (PMR) method using an alcohol solvent.
Figure 3:
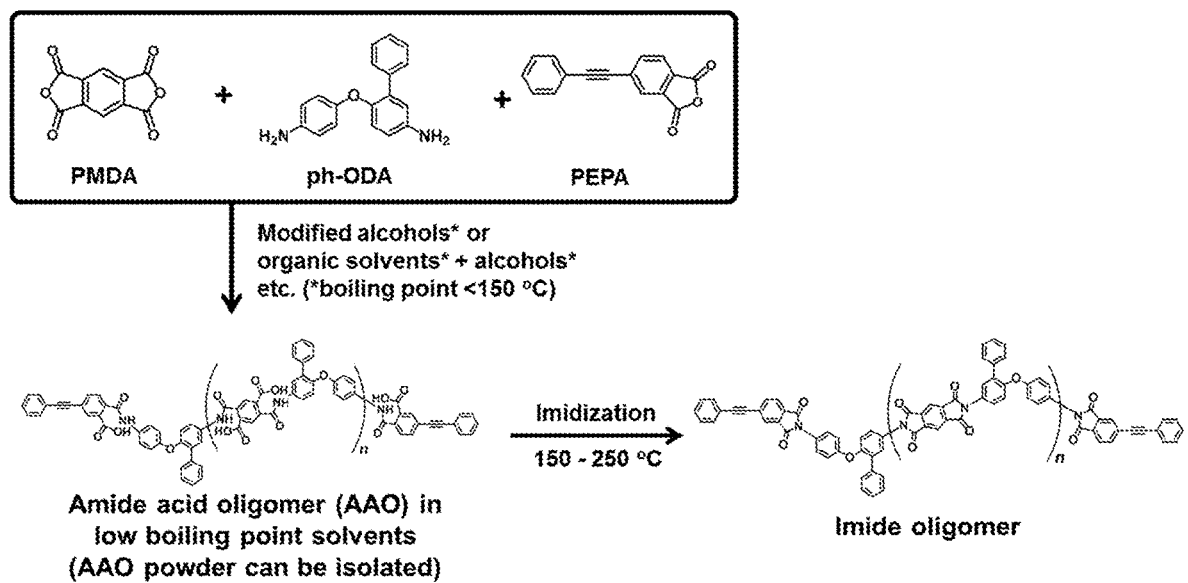
FIG. 3 represents a reaction scheme of synthesizing imide oligomers using an amide acid oligomer (AAO) method in accordance with the present disclosure.

AAO solution impregnated prepregs have been developed to solve the toxicity issue of conventional monomer impregnated prepregs. Although it can be observed that both the AAO method (FIG. 3) and the PMR method (FIG. 2) use ph-ODA, using the AAO method ph-ODA is incorporated into AAO by polymerization in solvents in advance, and then the fibers are impregnated into the AAO solution to make an AAO prepreg. The AAO in the prepreg can be converted to imide oligomers by heating. In contrast, as for the PMR method, solution which involves all of the monomers (including ph-ODA) is impregnated into the fibers and then all of the monomers in the prepreg can be converted to be imide oligomers via AAOs by heating. Generally it is difficult to isolate only the intermediate AAO in the heating process of PMR method due to the comparative reactions of formation of the AAO from monomers and imidization of the AAO.

Polyamide acids and AAOs are generally dissolved in high polar organic solvent such as g-BL, DMAc, and NMP easily. However, polyamide acids and AAOs are generally insoluble in any alcohol solvents such as methanol, ethanol, and propanol. One advantage to the AAO method described herein is that the invented AAO solution herein can be prepared by stirring aromatic diamines and aromatic tetracarboxylic dianhydride, and unsaturated acid anhydrides in modified alcohol solvents with boiling points less than 150° C. or mixture solvents composed of cyclic ether solvents and alcohols which have boiling points less than 150° C. Further, these solvents with boiling points less than 150° C. described above can be easily removed to make dried AAO powders. Dried AAO powders have better storage stability than AAO solution because less hydrolysis may occur with AAO in the solid state. Also, these solvents with boiling points less than 150° C. described above used in the AAO solution to impregnate fibers to form prepregs can be easily removed by heating the prepregs, or heating the prepregs in vacuum, during the composite molding to make dried AAO prepregs. Also, these solvents with boiling points less than 150° C. described above used in AAO prepregs can be easily removed by heating the prepreg, or heating the prepreg in a vacuum, to mold void-less composites.

The dried AAO powder which is used in the making of prepregs of the present disclosure have less melt flowability at temperatures below 150° C., which provides the ability to suppress the resin flow-out in composite molding in comparison with conventional prepregs made by the PMR method. The complex viscosity ($\eta^*$) of the AAO powder may range from about $10^3$ to about $10^6$ Pa·s over a temperature range of about 25° C. to about 150° C. In some embodiments, the complex viscosity of the AAO powder may be greater than about $10^4$ Pa·s over a temperature range of about 25° C. to about 150° C. In some embodiments, the complex viscosity may range from about $10^4$ to about $10^6$ Pa·s over a temperature range of about 25° C. to about 150° C. As a result, the desired resin and fiber ratio in the prepregs can be maintained in the resulting composites without resin loss which provide good thermal and mechanical properties.

Another advantage provided by the present method is higher elongation-at-break of the neat cured resins, which provides better impact resistance to carbon fiber reinforced polymer composites.

The present method also provides better tackiness of AAO prepregs for lay-up prior to molding the composites. The molded polyimide composites also show a higher short beam shear strength (SBS) as well as the composites prepared using previous methods.

As a result of the intensive studies in order to solve the problems described above, the inventors have found prepregs impregnated by amide acid oligomers and specific modified alcohol solvents or mixture solvents composed of organic solvents and alcohols prepared by the AAO method can be used to solve unmet needs in the art.

Amide Acid Oligomer

In some embodiments, an amide acid oligomer is represented by General formula (1), as shown below:

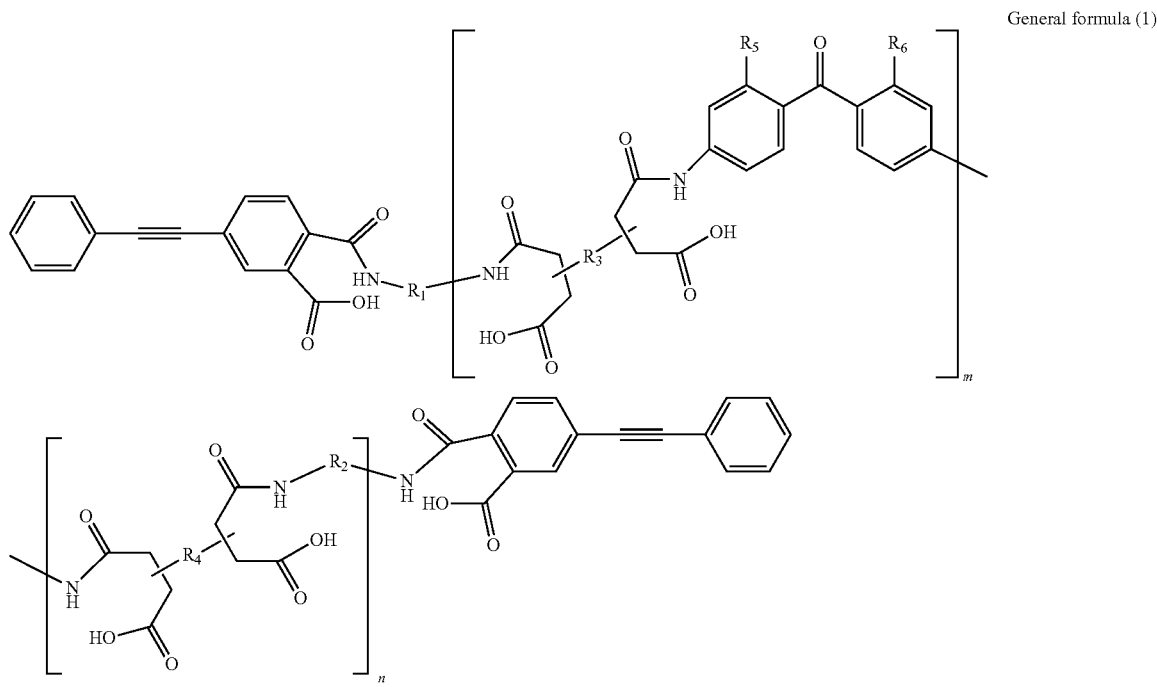

General formula (1)

wherein, each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly. The two amide linkages attached to the tetravalent aromatic tetra carboxylic acid residue represented by $R_3$ and $R_4$ can be oriented such that the two amide linkages on either side of the residue are located at the meta-position of the residue relative to each other, and/or at the para-position of the residue relative to each other, in the synthesized AAO. For example, in General formula (3) illustrated below, the two amide linkages attached to the 1,2,4,5-benzenetetracarboxylic acid residue in the n-group and in the m-group are located at the meta-position relative to each other.

In some embodiments, an amide acid oligomer is represented by General formula (2), as shown below:

wherein, each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly. The two amide linkages attached to the tetravalent aromatic tetra carboxylic acid residue represented by $R_3$ and $R_4$ can be oriented such that the two amide linkages on either side of the residue are located at the meta-position of the residue relative to each other, and/or at the para-position of the residue relative to each other, in the synthesized AAO. For example, in General formula (3) illustrated below, the two amide linkages attached to the 1,2,4,5-benzenetetracarboxylic acid residue in the n-group and in the m-group are located at the meta-position relative to each other.

In some embodiments, an amide acid oligomer is represented by General formula (3), as shown below:

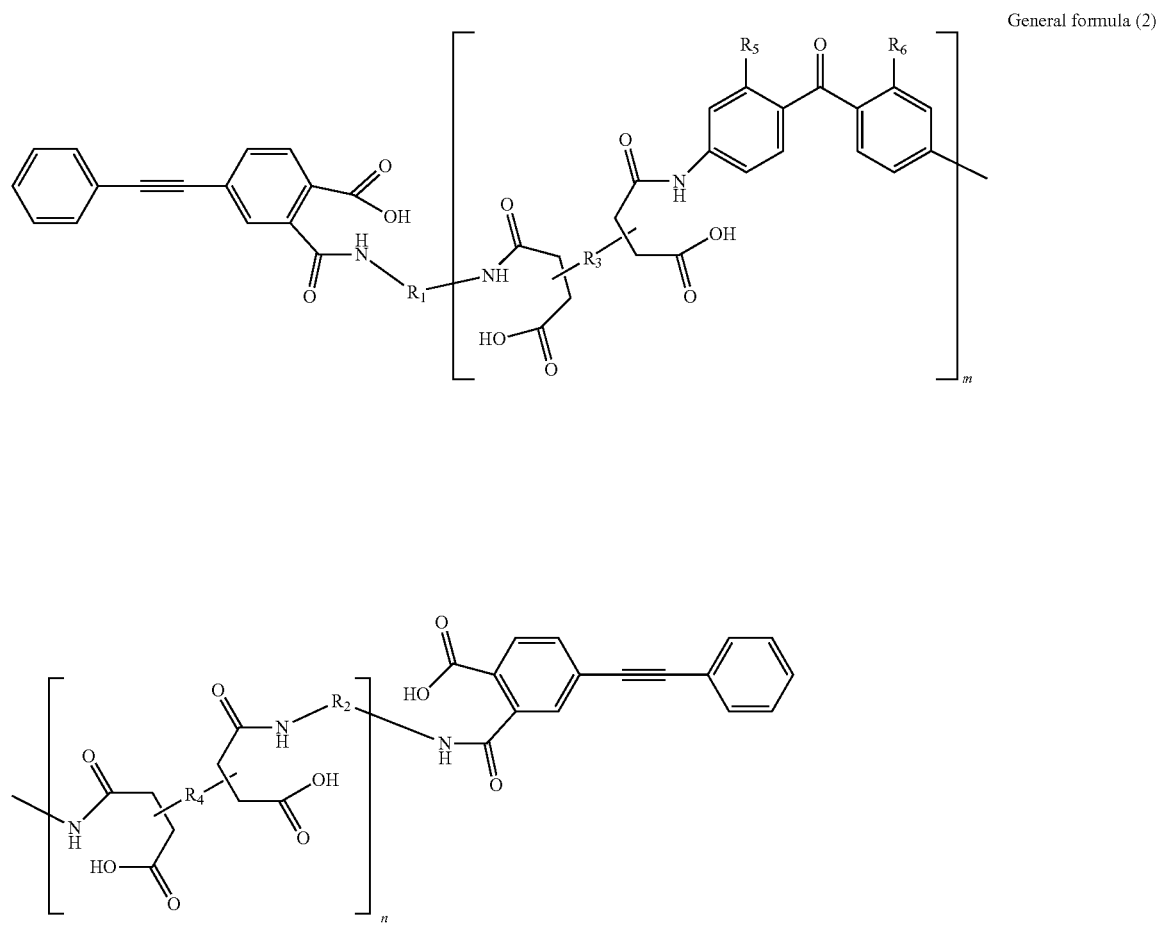

General formula (2)

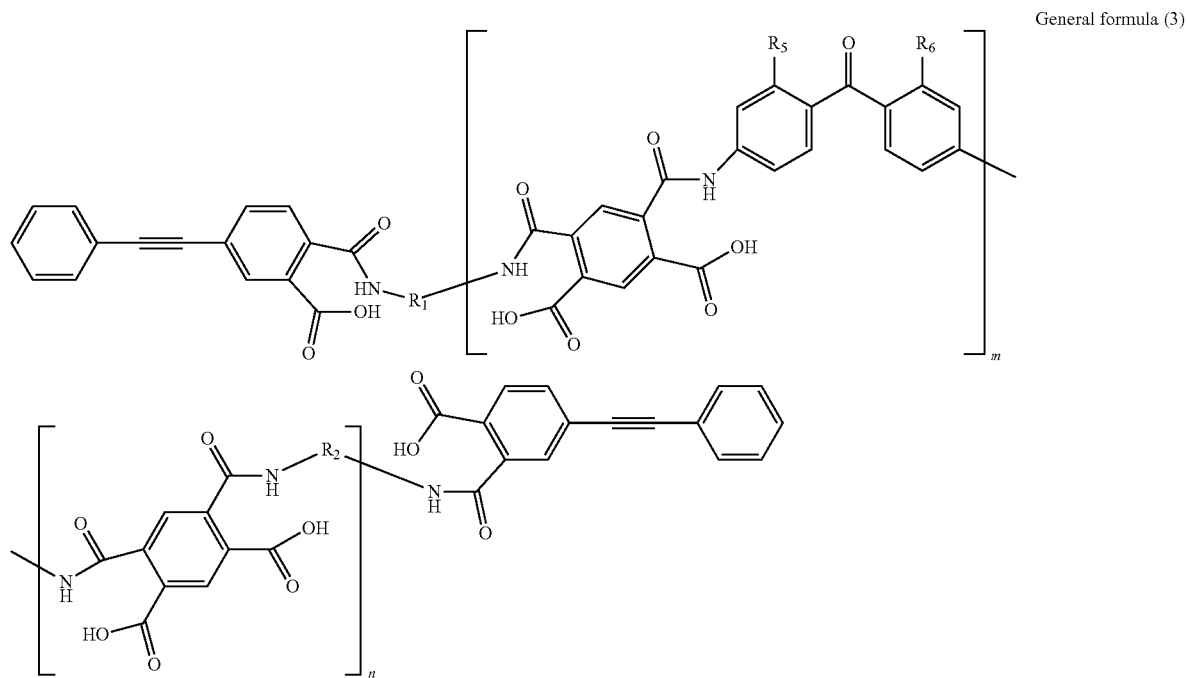

General formula (3)

wherein, each $R_1$ and $R_2$ represents bivalent aromatic diamine residue; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly. Two amide linkages attached to 1,2,4,5-benzenetetracarboxylic acid residue in the n-group and/or the m-group can be located at the meta-position relative to each other, or at the para-position relative to each other, in the synthesized AAO.

In some embodiments, the amide acid oligomer is represented by General formula (4) as shown below:

wherein each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly. The two amide linkages attached to the tetravalent aromatic tetra carboxylic acid residue represented by $R_3$ and $R_4$ can be oriented such that the two amide linkages on either side of

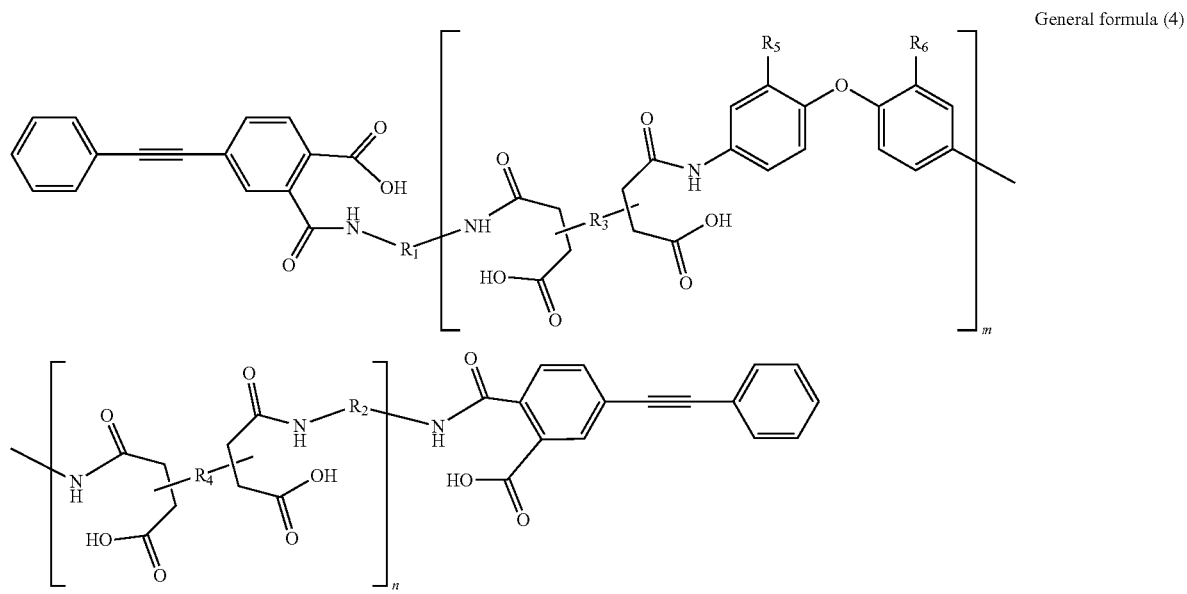

General formula (4)

the residue are located at the meta-position of the residue relative to each other, and/or at the para-position of the residue relative to each other, in the synthesized AAO. For example, in General formula (3) illustrated above, the two amide linkages attached to the 1,2,4,5-benzenetetracarboxylic acid residue in the n-group and in the m-group are located at the meta-position relative to each other.

In some embodiments, the aromatic diamine residue in General formula (1), (2) (3), or (4), above is an aromatic organic group present between the two amino groups in the aromatic diamine. The aromatic tetracarboxylic acid residue in General formula (1), (2), (3), or (4), above is an aromatic organic group present as surrounded by 4 carbonyl groups of the aromatic tetracarboxylic acid. The aromatic organic group is an aromatic ring-containing organic group. The aromatic organic group is preferably an organic group having 4 to 30 carbon atoms, more preferably an organic group having 4 to 18 carbon atoms, still more preferably an organic group having 4 to 12 carbon atoms. In addition, the aromatic organic group is preferably a hydrocarbon group having 6 to 30 carbon atoms, more preferably a hydrocarbon group having 6 to 18 carbon atoms, and still more preferably a hydrocarbon group having 6 to 12 carbon atoms.

$R_5$ and $R_6$ each individually represent a hydrogen atom or a phenyl group, where at least one of $R_5$ and $R_6$ is a phenyl group. It is preferably an imide oligomer having imide bonds in the main chain and one or two additional polymerizable unsaturated end-groups derived from 4-(2-phenylethynyl) phthalic anhydride at one or two terminals (favorably two terminals) that satisfies the relationship of $1 \leq m+n \leq 20$ and is solid (powdery) at normal temperature (approximately 23° C.).

Method of Making an Amide Acid Oligomer Solution

A method of making an amide acid oligomer solution includes dissolving an aromatic diamine and an aromatic tetracarboxylic dianhydride compound in a solvent to form a mixture. The solvent has a boiling point of less than about 150° C. The mixture is stirred at a temperature ranging from about 5° C. to about 60° C. The mixture is stirred for about 1 hour to about 24 hours to form a reaction solution. An unsaturated acid anhydride is added to the reaction solution, after which the reaction solution is stirred at a temperature ranging from about 5° C. to about 60° C. for about 1 minute to about 180 minutes to form an amide acid oligomer solution, where the amide acid oligomer solution includes the amide acid oligomer in the solvent.

In some embodiments, the aromatic tetracarboxylic compound is selected from 1,2,4,5-benzenetetracarboxylic acid, 3,3',4,4'-biphenyltetracarboxylic acid, bis(3,4-carboxyphenyl)ether, or a combination of at least two of them, and in particular, it is more preferably 1,2,4,5-benzenetetracarboxylic dianhydride, 3,3',4,4'-biphenyltetracarboxylic dianhydride or bis(3,4-carboxyphenyl) ether dianhydride.

In some embodiments, in a reaction of one or more tetracarboxylic dianhydrides, aromatic diamines including 2-phenyl-4,4'-diaminodiphenylether, and an unsaturated acid anhydride to form an unsaturated end group, such as 4-(2-phenylethynyl)phthalic anhydride, to synthesize an amide acid oligomer, the total amount of anhydride groups and the total amount of the primary amino groups are almost the same in the presence of solvents. Thus, in the General formulae (1), (2), and (4), above, the tetravalent aromatic tetra carboxylic acid residue of $R_3$ and $R_4$ are each independently selected from the groups derived from the various tetracarboxylic compounds above and may be the same as or different from each other. When m>1 and n>1 are satisfied, $R_3$ and $R_4$ may be the same as or different from each other.

In some embodiments, the 1,2,4,5-benzenetetracarboxylic acid is 1,2,4,5-benzenetetracarboxylic acid, 1,2,4,5-benzenetetracarboxylic acid dianhydride (PMDA) or an acid derivative thereof such as 1,2,4,5-benzenetetracarboxylic ester or salt, and in particular, 1,2,4,5-benzenetetracarboxylic dianhydride is most favorable. The amide acid oligomer, when $R_3$ and $R_4$ are a 1,2,4,5-benzenetetracarboxylic acid residue, is represented by General formula (3) above.

Alternatively, or in combination with the 1,2,4,5-benzenetetracarboxylic acid residue, the tetravalent aromatic tetra carboxylic acid residue of $R_3$ and $R_4$ can include 3,3',4,4'-biphenyltetracarboxylic dianhydride (s-BPDA) residue or bis(3,4-carboxyphenyl)ether (s-ODPA) residue, 3,3',4,4'-benzophenonetetracarboxylic dianhydride (BTDA) residue, 2,3,3',4'-biphenyltetracarboxylic dianhydride (a-BPDA) residue, 2,2',3,3'-biphenyltetracarboxylic dianhydride (i-BPDA) residue, or 2,2-bis(3,4-dicarboxyphenyl) methane dianhydride residue.

In some embodiments, the aromatic diamine can include one or more of 2-phenyl-4,4'-diaminodiphenylether, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenylether (4,4'-ODA), 3,4'-diaminodiphenylether (3,4'-ODA), 3,3'-diaminodiphenylether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl) methane, 4,4'-methylene-bis(2-ethyl-6-methylaniline), 2,2-bis(3-aminophenyl)propane, 2,2-bis(4-aminophenyl) propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl] hexafluoropropane, 9,9-bis(4-aminophenyl)fluorene, 9,9-bis(4-(4-aminophenoxy)phenyl) fluorene and the like, and these compounds may be used alone or in combination of two or more. In particular, the aromatic diamine compound is most preferably 9,9-bis(4-aminophenyl)fluorene, 9,9-bis(4-(4-aminophenoxy)phenyl)fluorene or 1,3-diaminobenzene.

In an embodiment, the aromatic diamine is 2-phenyl-4, 4'-diaminodiphenylether. In an amide acid oligomer represented by General formulae (1), (2), (3), and (4), $R_1$ and $R_2$ can be a residue of 2-phenyl-4,4'-diaminodiphenylether. Alternatively, or in combination with the 2-phenyl-4,4'-diaminodiphenylether residue, the bivalent aromatic diamine residue can include a residue of any of the aromatic diamine compounds listed above.

The diamines described herein are preferably copolymerized for applications demanding higher mechanical strength, and the amount of the copolymeric diamine is preferably 0 to 50 mol %, more preferably 0 to 25 mol %, and still more preferably 0 to 10 mol %, with respect to the total amount of diamines. For example, in General formula (1), if the application requires higher mechanical strength, $0.05 \leq m/(m+n) \leq 1$ is preferable, and more preferably $0.75 \leq m/(m+n) \leq 1$, still more preferably $0.90 \leq m/(m+n) < 1$ and most preferably $0.90 \leq m/(m+n) < 0.95$. In one aspect, the diamine for copolymerization is 9,9-bis(4-aminophenyl)fluorene, 9,9-bis(4-(4-aminophenoxy)phenyl)fluorene or 1,3-diaminobenzene.

Advantageously, imide oligomers and cured resins thereof obtained from amide acid oligomers produced by copolymerization with aromatic diamines above is superior in thermal properties. Of course, in the present invention, an aromatic diamine may be used without copolymerization based on the particular desired applications.

In the present invention, the unsaturated acid anhydride, which is used for terminal modification (e.g. end capping the amide acid oligomer) is preferably 4-(2-phenylethynyl) phthalic anhydride. The 4-(2-phenylethynyl)phthalic anhydride is preferably used in an amount in the range of 5 to 200 mol %, particularly 5 to 150 mol % with respect to the total amount of aromatic tetracarboxylic acids. This 4-(2-phenylethynyl)phthalic anhydride may be used alone or in combination with other end caps such as nadic anhydride, phthalic anhydride, and 2-methylphthalic anhydride in order to achieve excellent thermal and mechanical characteristics of the resulting cured imide resin or fiber reinforced composites.

Examples of the solvent for use include, but are not limited to, modified alcohols such as 2-methoxyethanol (boiling point=125° C.), 2-ethoxyethanol (boiling point=135° C.), 2-methoxypropanol (boiling point=102° C.), 1,3-dioxolane (boiling point=75° C.), and 2-methyl-1,3-dioxolane (boiling point=83° C.), THF (boiling point=66° C.), 1,3-dioxane (boiling point=105° C.), 1,4-dioxane (boiling point=101° C.). These solvents are used solely or in combination of two or three of them, or in combination with alcohols, for example methanol, ethanol and propanol.

The method of producing the terminally modified amide acid oligomer according to the present invention is prepared, for example, by preparing an amide-acid bond-containing oligomer by polymerizing aromatic tetracarboxylic acid compounds (in some embodiments, aromatic tetracarboxylic dianhydrides), aromatic diamines including 2-phenyl-4,4'-diaminodiphenylether, and (2-phenylethynyl)phthalic anhydride, each in amounts at which the total amount of acid anhydrous groups in all components (in the case of neighboring dicarboxylic acid groups, it is assumed that there is one mole of acid anhydride group per two moles of carboxyl group) and the total amount of amino groups are almost the same, in an organic solvent described below at a reaction temperature of approximately 100° C. or lower, particularly at 80° C. or lower.

In one embodiment, a method for producing the amide acid oligomer according to the present invention includes the following steps:
i. dissolving aromatic diamines including 2-phenyl-4,4'-diaminodiphenylether in an the solvent to form a solution;
ii. adding aromatic tetracarboxylic dianhydrides containing 1,2,4,5-benzenetetracarboxylic dianhydride to the solution to form a mixture;
iii. stirring the mixture at a reaction temperature of approximately 5 to 60° C. for about 1 to 24 hours until the mixture is uniform and forms a reaction solution;
iv. adding 4-(2-phenylethynyl)phthalic anhydride to the reaction solution; and
v. stirring the resulting mixture at a reaction temperature of approximately 5 to 60° C. for about 1 to 180 minutes to form an amide acid oligomer solution.

In the reaction to prepare AAO solution above, all or part of the reaction steps are preferably carried out under an inert gas atmosphere such as nitrogen gas or argon gas. The solid content of the amide acid oligomer solution is preferably at a range from about 15 to about 60% by weight, more preferably from about 20 to about 60% by weight, and most preferably about 30 to about 60% by weight to obtain a composite with good mechanical properties after the prepreg is thermally molded to a composite, Amide Acid Oligomer Powder and Method of Making the Same The dried amide acid oligomer powder can be obtained using the amide acid oligomer solution prepared as described herein. In some embodiments, a method of making an amide acid oligomer powder includes pouring the amide acid oligomer solution into an aluminum tray and placing it into an air circular oven or vacuum at 20 to 60° C. for 60 minutes to 48 hours at atmosphere or in vacuum. The amide acid oligomer recovered from the aluminum tray can be crushed into a powder form.

Alternatively, in some embodiments, an amide acid oligomer powder can be prepared by pouring the amide acid oligomer solution into a solvent in which amide acid oligomer cannot be dissolved, such as water, alcohols, or hexane to precipitate the amide acid oligomer. The amide acid oligomer can be filtered, dried, and crushed to a powder form.

The amide acid oligomer may be used as a powder or, as needed, as a solution, as it is dissolved in a solvent. In addition, the amide acid solution may be used, directly as it is or after it is diluted or concentrated, as needed, as a liquid composition (varnish) containing the amide oligomer.

The amide acid oligomers prepared according to the present invention may involve amide acid oligomers with different molecular weights, as they are mixed. Alternatively, the amide oligomer according to the present invention may be used, as it is mixed with another amide acid.

Imide Oligomer and Cured Film

An imide oligomer powder can be obtained using the amide acid oligomer solution or the amide acid oligomer powder. In some embodiments, the amide acid oligomer solution prepared above is poured into an aluminum tray and placed in an air circular oven at 140 to 275° C. for 60 minutes to 48 hours, completely removing the solvent and water which is generated as a by-product of imidization reaction of amide acid oligomer, to convert to imide oligomer. Combinations of catalysts such as acetic anhydride and pyridine, and acetic anhydride and triethylamine can also be used to accelerate the imidization reaction of AAO in solvents chemically. Imide oligomer mixture having higher molecular weight components may be used to provide high thermal aging stability to the cured resins as reported in literature (Kubota et al. High Performance Polymers, 2017, 30(3), 347-354.). The imidization of amide acid oligomer powders is thought to be able to suppress a transverse reaction from amide acid oligomers to monomers in an equilibrium state because of the low reactivity for the dissociation at solid-state.

In some embodiments, a cured imide resin of the imide oligomer can be prepared, for example, by casting the amide acid oligomer solution or the amide acid oligomer powder or the imide oligomer powder onto a substrate and then heating in the temperature range from 280 to 500° C. for 5 to 200 minutes. The cured imide resin of the modified imide oligomer according to the present invention can also be prepared by the following example of press molding. The amide acid oligomer or the imide oligomer prepared above is filled in a mold such as a metal mold and compression-molding, followed by heating in a temperature range from 10 to 280° C. and 1 to 10 kg/cm$^2$ for about 1 second to 360 minutes, preferably for about 10 minutes to 3 hours, and curing the intermediate molding at 280 to 500° C. for about 10 minutes to 360 minutes, preferably for about 30 minutes to 120 minutes. The Tg of the cured imide resin is preferably 320° C. or higher. The tensile breaking elongation of the film is preferably 15% or more. The test method will be described below.

Prepreg

An AAO prepreg can be produced by impregnation of the amide acid oligomer solution above into fibers.

In some embodiments, the amide acid oligomer solution with total amount of 20% by weight or more of amide acid oligomer is prepared. If necessary, the amide acid oligomer solution (e.g., a varnish) is appropriately concentrated or diluted, and then is impregnated into fibers arranged in one direction in a planer shape or a fiber fabric, yielding a wet prepreg. The wet prepreg may be at least partially dried by a known method such as heating, giving a partially dried or completely dried prepreg. The AAO prepregs of the present invention include a wet AAO prepreg, a partially dried AAO prepreg, and/or a dry AAO prepreg.

An imide prepreg can be prepared by heating the amide acid oligomer impregnated fiber at a temperature sufficient to convert the amide acid oligomer to an imide oligomer. An exemplary temperature range may be about 140° C. to about 275° C.

A fiber-reinforced composite material can be produced by stacking or arranging the amide acid prepregs, imide prepregs, or a combination thereof, and thermally curing the stack to form the fiber-reinforced composite material. For the fiber-reinforced composite material to exhibit excellent mechanical strength there should be a balance between a cured resin and fibers in the fiber-reinforced composite material. The amount of the amic acid oligomer attached to the fibers is preferably 10 to 60% by weight, more preferably 20 to 50% by weight, and even more preferably 30 to 50% by weight, relative to the total weight of the prepreg composed of amid acid oligomer solution and carbon fiber.

In order to easily handle the prepregs at the time of stacking, to prevent the AAO solution in the prepreg from flowing out in the process of molding a composite material, and to produce a fiber-reinforced composite material exhibiting excellent mechanical strength, the amount of the organic solvent attached to the fibers is preferably 1 to 30% by weight, more preferably 5 to 25% by weight, and even more preferably 5 to 20% by weight relative to the total weight of the prepreg.

Examples of the fibers used in the present invention include carbon fibers, glass fibers, metal fibers, and ceramic fibers; as well as synthetic organic fibers such as polyamide fibers. These fibers may be used as a single type or a combination of two or more types. In particular, in order to achieve excellent mechanical characteristics, carbon fibers are desirable. Any type of carbon fibers can be used as long as there is a carbon content ranging from 85 to 100% by weight and a continuous fiber form with at least a partial graphite structure. Examples of the carbon fibers include polyacrylonitrile (PAN)-based carbon fibers, rayon-based carbon fibers, lignin-based carbon fibers, and pitch-based carbon fibers. Among them, carbon fibers such as PAN-based carbon fibers and pitch-based carbon fibers are preferred because they are widely used, are inexpensive and have high strength. Typically, the carbon fibers have been subjected to sizing treatment. Such fibers may be used without any treatment or may be washed with an organic solvent or the like to remove the sizing agent, as necessary. Some functional groups such as carboxylic acid in amide acid oligomer can make covalent bonds on functional groups on bare carbon fibers or sizing agent on carbon fibers to make strong interfacial properties between cured imide resins and carbon fibers in molded composites, exhibiting excellent mechanical strength. The fiber material constituting the amide acid oligomer prepreg has a structure of a continuous fiber form such as UD (unidirectional) forms, weave forms (plain weave, satin weave, for example), and knit forms, and is not limited to particular forms. The form can be appropriately selected depending on the purpose. The forms may be used singly or in combination of two or more of them.

To form a composite structure, a plurality of prepreg plies may be laid up on a tool in a stacking sequence to form a "prepreg lay-up." The prepreg plies within the layup may be positioned in a selected orientation with respect to one another, e.g. 0°, ±45°, 90°, etc. In designation of lay-up sequences of prepregs, the specified angles of the warp ($\theta_{warp}$) and weft ($\theta_{weft}$) fibers oriented in a single layer of woven fabric represents as ($\theta_{warp}/\theta_{weft}$), respectively. In designation of unidirectional lay-up sequences of woven prepregs described as $[(\theta_{warp}/\theta_{weft})]_N$, N represents a whole number of the stacked prepregs. In designation of quasi-isotropic lay-up sequences described as $[(\theta_{warp}/\theta_{weft})/(\theta_{warp}/\theta_{weft})/ \ldots ]_{NS}$, N represents the number of prepreg groups derived from $[(\theta_{warp}/\theta_{weft})/(\theta_{warp}/\theta_{weft})/ \ldots ]$ stacked with mirror symmetry in a laminate. S represents the meaning of "Symmetry". The fiber direction of each layer of the prepreg is not limited to a particular orientation but can be appropriately selected in order to achieve excellent mechanical characteristics of the resulting composites. The layup sequence of the AAO prepregs in this invention is not limited to particular forms, but can be appropriately selected depending on the purpose.

In some embodiments, the fiber-reinforced composite material of the present invention can be obtained as follows, for example. A predetermined number of the prepregs are stacked along with a predetermined layup sequence of carbon fiber prepregs. The prepregs are thermally cured in a plastic bag with reduced pressure inside or without a bag using an autoclave, a hot press, a convection oven or a similar apparatus solely or in combination at a temperature of 80 to 500° C. at a pressure of 1 to 1,000 kg/cm$^2$ for about 10 minutes to 40 hours, giving a fiber-reinforced composite material. Release films, breather cloths, breeder cloths and caul plates can also be appropriately used with a stacked prepreg together. A further post cure can also be applied using a convection oven or a vacuum oven for the molded composite materials above to enhance thermal and mechanical characteristics, as necessary. In the present invention, in addition to the use of the prepreg, the amide acid wet prepregs or the amide acid dry prepregs may be stacked and thermally cured in the same manner as the above, giving a fiber-reinforced composite material.

The fiber-reinforced composite material of the present invention obtained as above preferably has a glass transition temperature (Tg) of 320° C. or more. The measurement is in accordance with the method described below. The film-like molded article of the cured imide resin composition or the amide acid prepreg may be inserted between a fiber-reinforced composite material and a different material, and the whole may be heated and melted to be integrated, giving a fiber-reinforced composite material structure. Here, the different material is not limited to particular materials and may be any materials commonly used in the field. Examples of the materials include honeycomb metal materials and sponge-like core materials.

Test Methods

Examples are described below in accordance with embodiments of the present invention, but are not intended to limit the present invention thereto. The characteristics described in the Examples below were determined under the specified test conditions described below.

Measurement of glass transition temperature (Tg): For film-like products, a dynamic viscoelasticity analyzer (DMA, model: RSA-11, manufactured by Rheometric) was used for measurement at a temperature increase rate of 10° C./min at a frequency of 1 Hz. The intersection of two tangent lines before and after the drop of a storage elastic modulus curve was regarded as the glass transition temperature. For fiber-reinforced composite materials, a dynamic viscoelasticity analyzer (DMA, model: DMA-Q-800, manufactured by TA instruments) was used for measurement in a cantilever manner at a strain of 0.1% at a frequency of 1 Hz under a nitrogen stream at a temperature increase rate of 10° C./min. The intersection of two tangent lines before and after the drop of a storage elastic modulus curve was regarded as the glass transition temperature.

Measurement of minimum melt viscosity: A rheometer (model: Discovery HR-2, manufactured by TA instruments) was used for measurement with a 25-mm parallel plate at a temperature increase rate of 5° C./min.

Elastic modulus measurement, breaking strength measurement, breaking elongation measurement: A tensile testing machine (product name: eXpert 4200, manufactured by ADMET) was used for measurement at room temperature at a tensile speed of 1 mm/min. The test pieces had a film-like shape having a length of 25 mm, a width of 5 mm, and a thickness of 80 to 120 micron meter.

Gel Permeation Chromatography (GPC) measurement: A GPC system (product name: Prominence, manufactured by Shimadzu Corporation) was used for molecular weight measurement using NMP eluent with two GPC columns (product name: Phenogel 5 μm 10E4 A and Phenogel™ 5 μm 100 Å, manufactured by Phenomenex, Inc.). A relative molecular weight was calibrated using polystyrene standard manufactured by TOSOH Corporation.

Measurement of volume of fiber (Vf) in a composite panel was carried out using an equation below.

$$Vf = FAW \times A / (10 \times B \times C)$$

wherein,
FAW is the fiber areal weight of fabric carbon fiber (g/m$^2$),
A is the number of prepregs stacked for molding a composite panel,
B is the density of carbon fiber (g/cm$^3$), and
C is the thickness of the molded fiber reinforced polyimide composite (mm).

SBS test of composite materials was carried out at 25° C. and 288° C. using Instron 8502/CN0269 universal testing machine and an environmental chamber in accordance with ASTM-D2344. The average of the dimension for all test specimens are 24.0 mm (length), 9.0 mm (width), and 4.5 mm (thickness). The total number of test specimens was 6. The speed of testing at a rate of crosshead movement was 1.0 mm. The span-to-measured thickness ratio was 4.0.

Tensile test of composite materials was carried out at 25° C. using Instron 8502/CN0269 universal testing machine in accordance with ASTM D3039. The average of the dimension for all test specimens are 228.5 mm (length), 25.5 mm (width), and 3.1 mm (thickness). The total number of test specimens was 6. The speed of testing at a rate of crosshead movement was 1.0 mm.

Flexural test of composite materials was carried out at 25° C. using Instron 8502/CN0269 universal testing machine in accordance with ASTM D7264. The total number of test specimens was 6. The speed of testing at a rate of crosshead movement was 1.0 mm. The span-to-measured thickness ratio was 32.0.

Compression test of composite materials was carried out at 25° C. and 288° C. using Instron 8502/CN0269 universal testing machine and an environmental chamber in accordance with ASTM D6272. The total number of test specimens was 6. The speed of testing at a rate of crosshead movement was 1.0 mm.

Open hole compression (OHC) test of composite materials was carried out at 25° C. and 288° C. using Instron 8502/CN0269 universal testing machine and an environmental chamber in accordance with Northrop Material Specification NAI-1504. The total number of test specimens was 6. The speed of testing at a rate of crosshead movement was 1.0 mm.

Compression after impact (CAI) test of composite materials was carried out at 25° C. using Instron 8502/CN0269 universal testing machine and an environmental chamber. Impact test was conducted in accordance with ASTM D7136. CAI test was conducted in accordance with ASTM D7137. The total number of test specimens was 6. The speed of testing at a rate of crosshead movement was 1.0 mm.

EXAMPLES

Example 1

270.8 g (980 mmol) of 2-phenyl-4,4'-dianminodiphenyl ether and 973.0 g of 2-methoxyethanol was added into a 2000 mL three-necked flask equipped with a thermometer, a stirring bar, and a nitrogen-supplying tube. 2-phenyl-4,4'-dianminodiphenyl ether was completely dissolved in the solvent under nitrogen flow for 3 hours at 40° C. for 1.5 hours. 183.2 g (840 mmol) of 1,2,4,5-benzenetetracarboxylic dianhydride was added into the solution, which was gradually dissolved in the solution by a polymerization reaction with 2-phenyl-4,4'-dianminodiphenyl ether under nitrogen flow at room temperature at 45° C. for 6 hours to give a light yellow colored transparent amide acid oligomer solution. 69.5 g (280 mmol) of 4-(2-phenylethynyl)phthalic anhydride was then added to the reaction solution and the resulting mixture was allowed to be reacted for terminal modification under nitrogen flow in the temperature range of from about 20° C. to 25° C. for 2 hours. A brown colored transparent solution of phenylethynyl group end-terminated amide acid oligomer was obtained. The solid content of amide acid oligomer in the solution was 40 wt %. The solution was placed in a closed vial and stored in a freezer at −18° C. for at least 3 months without generating any precipitation.

The amide acid oligomer solution was poured into an aluminum tray in a vacuum oven. The solvent was removed at 50° C. in a vacuum to obtain the amide acid oligomer form. The amide acid oligomer form was easily crushed to obtain the amide acid oligomer powder. The obtained amide acid oligomer is represented by General formula (1), (2), (3), or (4), in which $R_1$ and $R_2$ are each independently a 2-phenyl-4,4-diaminodiphenyl ether residue, $R_3$ and $R_4$ are each independently a 1,2,4,5-benzenetetracarboxylic dianhydride residue, and m=6 and n=0 on average.

Figure 4A:
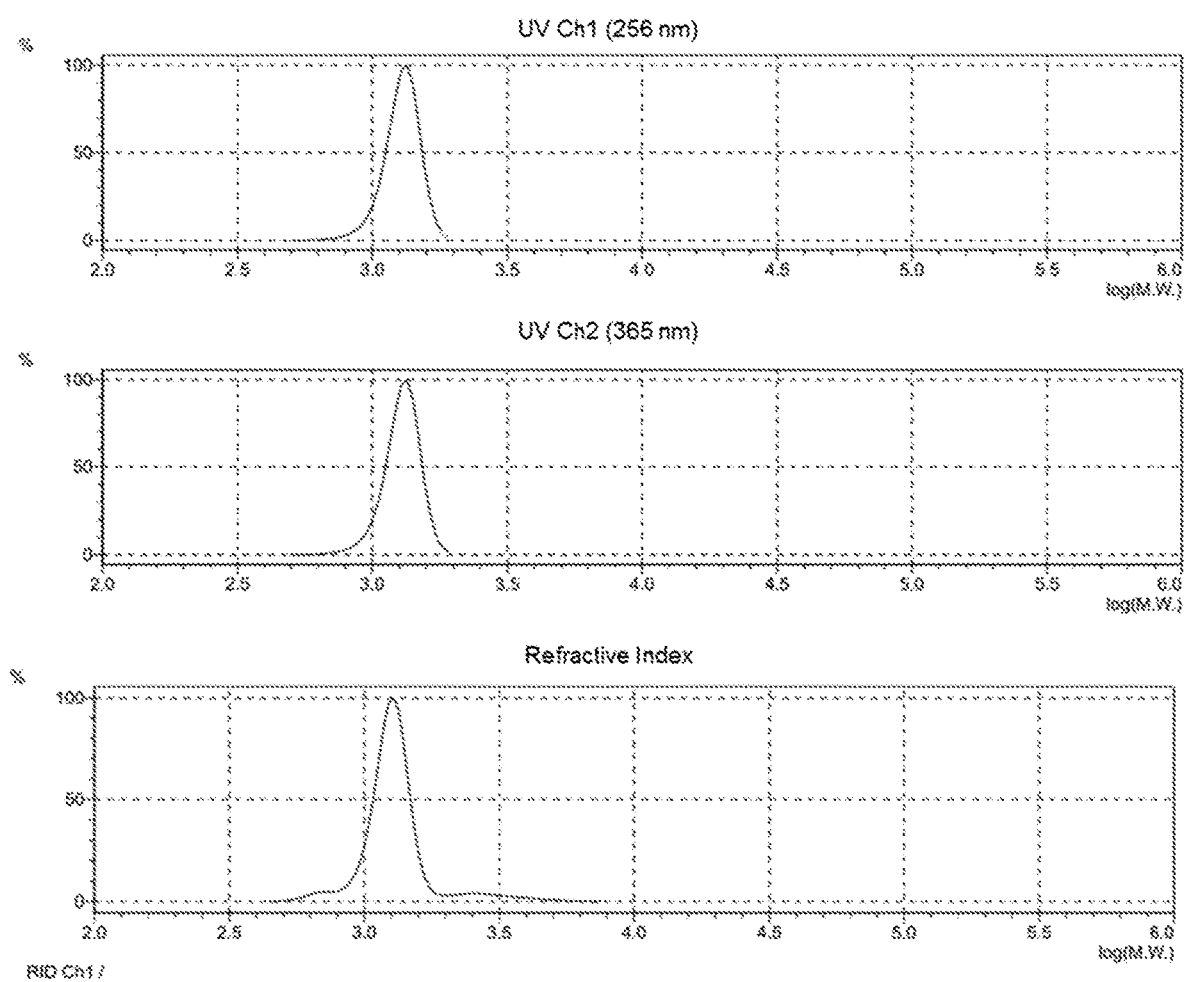
FIG. 4A depicts a gel permeation chromatography (GPC) chart of an imide oligomer that is represented by General formula (5), in which m=0 in accordance with the present disclosure.
Figure 4B:
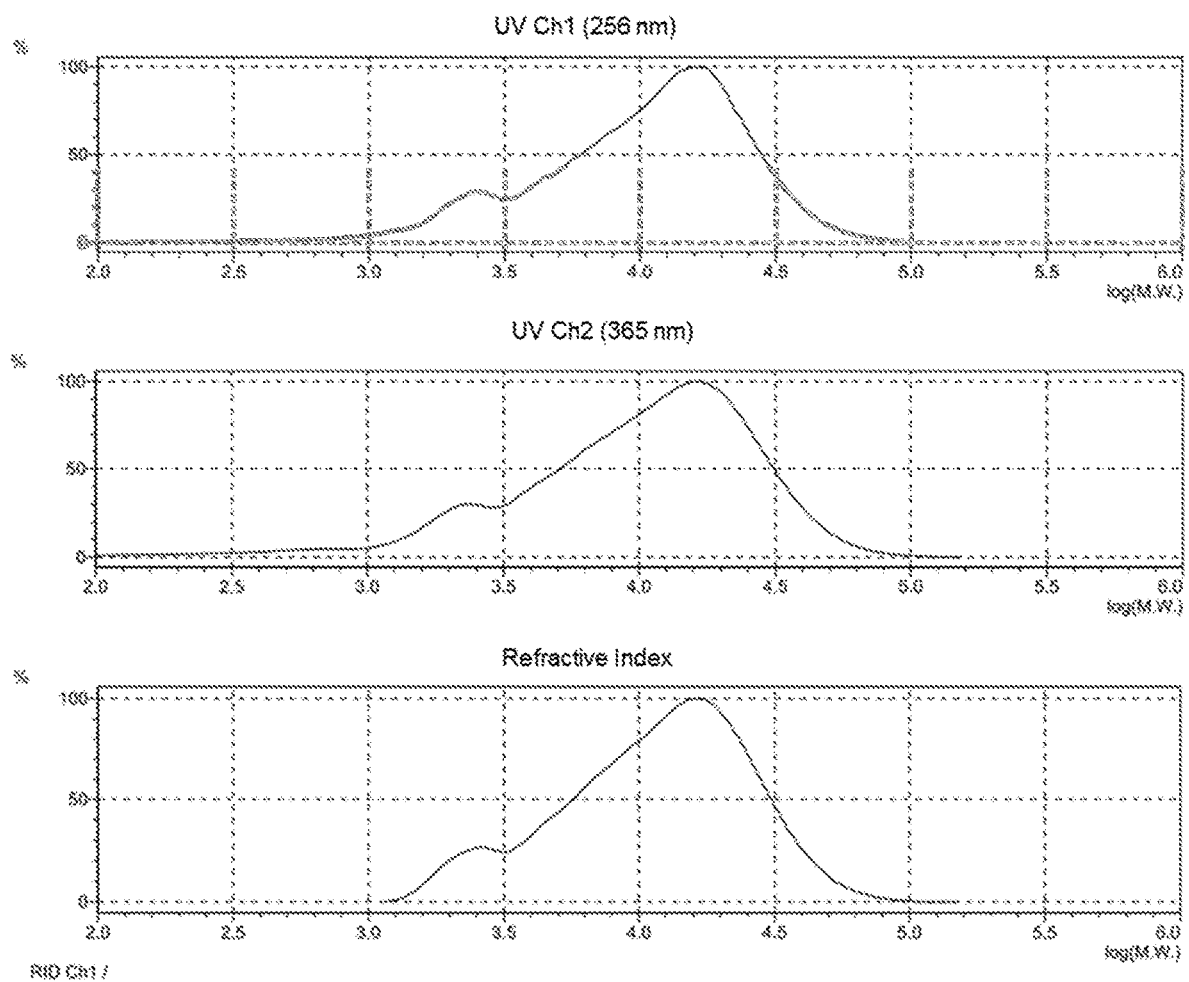
FIG. 4B depicts a GPC chart of an amide acid oligomer which was represented by General formula (1), (2), (3), or (4) in which $R_1$ and $R_2$ are each independently a 2-phenyl-4,4-diaminodiphenyl ether residue, $R_3$ and $R_4$ are each independently a 1,2,4,5-benzenetetracarboxylic dianhydride residue and m=6 and n=0 on average in accordance with the present disclosure.
Figure 5:
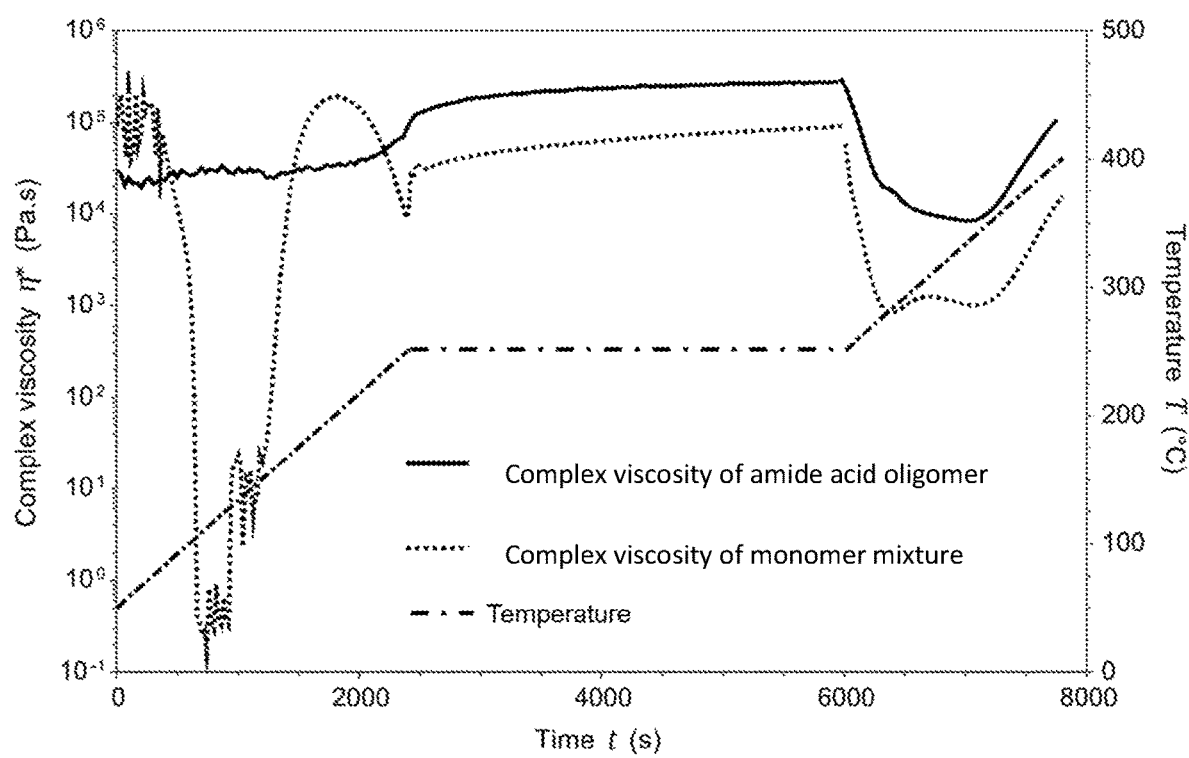
FIG. 5 depicts a graph displaying the melt viscosity data of a monomer mixture powder prior to impregnation in a fiber via the PMR method and an AAO powder prepared by the AAO method in accordance with the present disclosure.

The GPC data of the obtained amide acid oligomer powder showed multiple peaks in the molecular weight range from 3.3 to 8.3×10$^3$ (peak top molecular weight detected by UV at 256 and 365 nm), indicating that the AAO was surely synthesized in the solvent. No peaks derived from the used monomers and amide acid oligomer with n=0, which was separately synthesized using this invented method, were detected in the GPC chart (see FIGS. 4A and 4B). Furthermore, amide acid oligomer powder showed a constant melt viscosity in the temperature range from room temperature to 250° C. (see FIG. 5). In contrast, powder obtained by drying ethanol solution in which PMDA diethyl ester (PMDA DEE), 2-Ph-ODA, and PEPA mono-ethyl ester (PEPA MEE) are dissolved (see FIG. 5), showed a large viscosity drop in the temperature range from 80-150° C. because of the low melting points of monomers such as 2-ph-ODA and PEPA MEE, below 130° C. and generation of ethanol as a by-product in a reaction among these monomers to form an amide acid oligomer.

The obtained amide acid oligomer powder was added into an aluminum tray and placed into a convection oven to be thermally treated at 250° C. for 1 hour for the imidization. The resulting yellow colored form of the corresponding imide oligomer form was obtained. The imide oligomer form was easily crushed to obtain the imide oligomer powder. The obtained imide oligomer was represented by General formula (5), in which m=6 on average.

An imide oligomer represented by General formula (5), as shown below:

General formula (5)

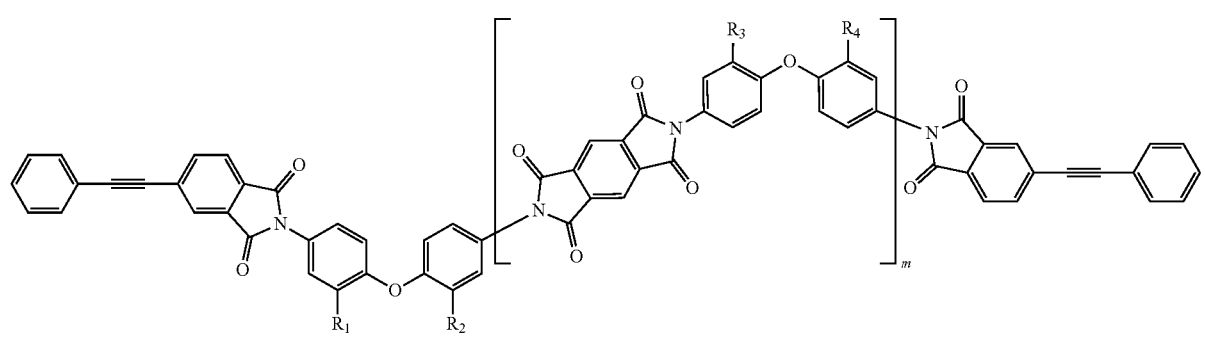

wherein, each $R_1$ and $R_2$ represents a hydrogen atom or a phenyl group, where at least one of $R_1$ or $R_2$ is a phenyl group; each $R_3$ and $R_4$ also represents hydrogen atom or a phenyl group, where at least one of $R_3$ and $R_4$ is a phenyl group; where $1 \leq m \leq 20$.

Figure 6:
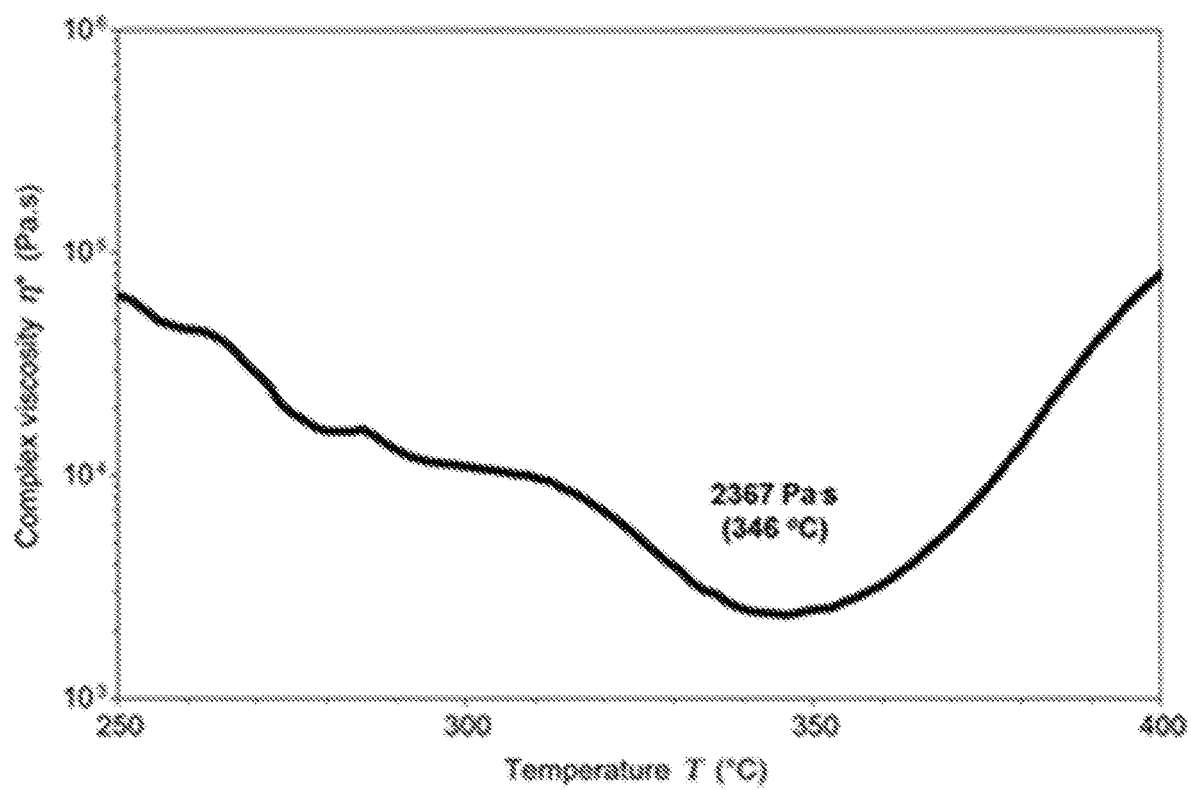
FIG. 6 depicts a graph representing typical differential scanning calorimetry melt viscosity data of a cured imide resin in accordance with the present disclosure.
Figure 7:
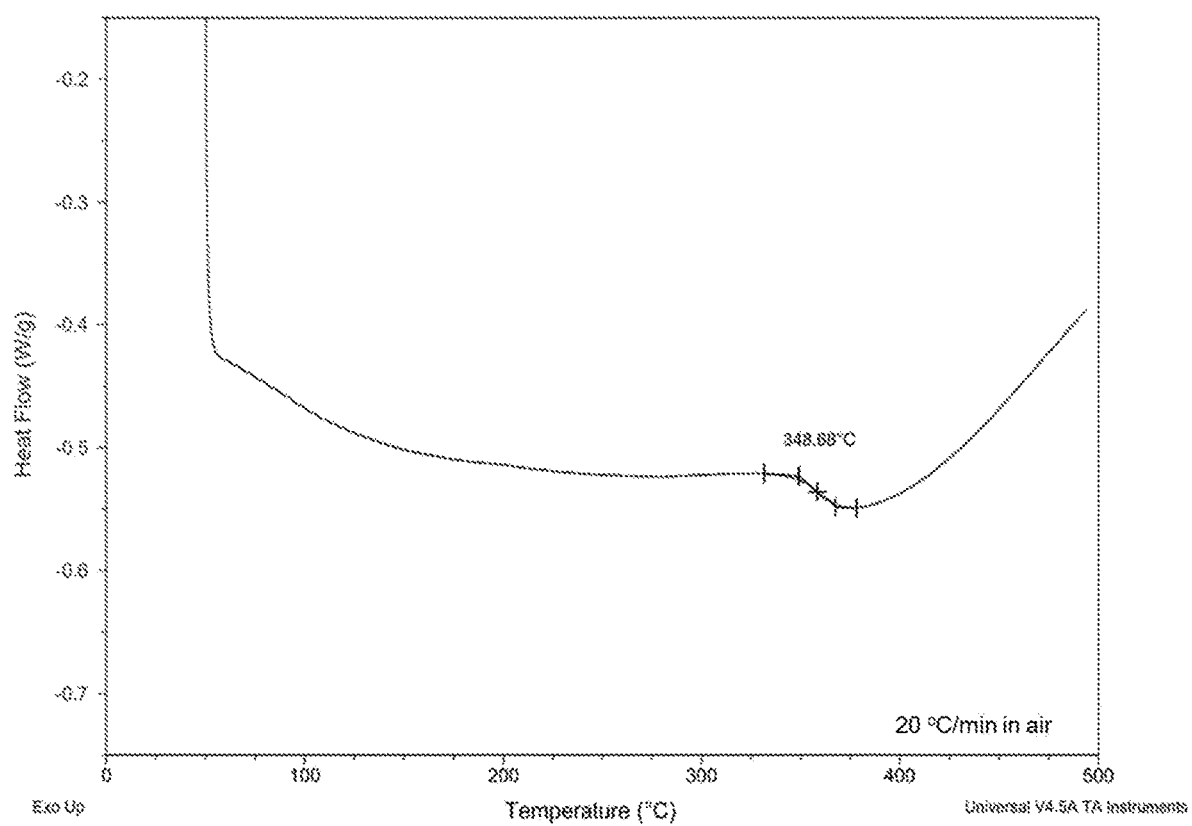
FIG. 7 depicts a graph representing typical differential scanning calorimetry data of a cured imide resin in accordance with the present disclosure.

The lowest melt viscosity of the powdery imide oligomer was 2592 Pa sec at 362° C., when measured by a rheometer as shown in FIG. 6.

Figure 8:
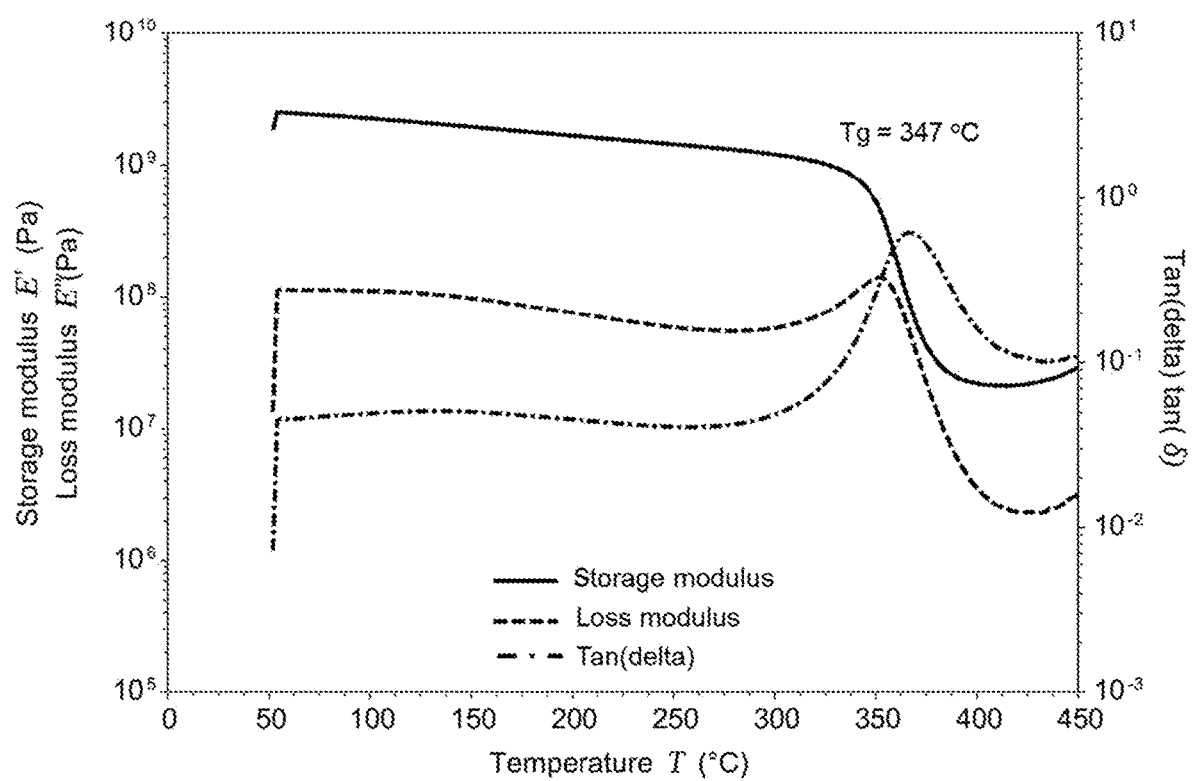
FIG. 8 depicts a graph representing typical dynamic mechanical analysis (DMA) data of cured imide resin in accordance with the present disclosure.

A film-shaped cured resin was molded by heating the powdery imide oligomer between two polyimide films at 370° C. by using a hot press for 1 hour. The molded cured resin (thickness: 100 m) showed a Tg of 354° C. (DMA, see FIG. 8). The cured resin showed a modulus of 2.3 GPa, a breaking strength of 125 MPa, and a breaking elongation of 32% by tensile test.

Carbon fiber prepreg sheets (12 inch×12 inch square) were made using 35 wt % of an amide acid oligomer solution prepared as described above, and 8 harness stain fabric carbon fibers (product name THORNEL T650/35 manufactured by Solvay Inc., FAW is about 373 g/m² and density of carbon fiber is 1.8 g/cm³. Each angle of the warp and weft fibers in the single layer of the 8 harness stain fabric is 0° and 900 by a dipping method. The amide acid oligomer prepregs had very good tackiness and drapability to be laid up prior to molding the composites. The amide acid oligomer prepregs also maintained the good tackiness and drapability for more than a half year after storage in the freezer in -18° C. in order to be easily laid up prior to molding the composites. The weight of carbon fiber, amide acid oligomer and solvent weight in the prepregs were 56 wt %, 26 wt % and 15 wt % on average, respectively.

A dried AAO prepreg was made by removing solvent from one ply of the prepared AAO solution prepreg above at 60° C. for 6 hours in an convection oven. The obtained dried AAO prepreg had about 38% of the AAO content by weight and 62% of the carbon fiber content by weight.

An imide oligomer prepreg was made by heating one ply of the dried AAO prepreg prepared above in a convection oven at 60° C. for 6 hours. The obtained dried AAO prepreg had about 55% of the AAO content by volume and 45% of the carbon fiber content by volume.

Figure 9:
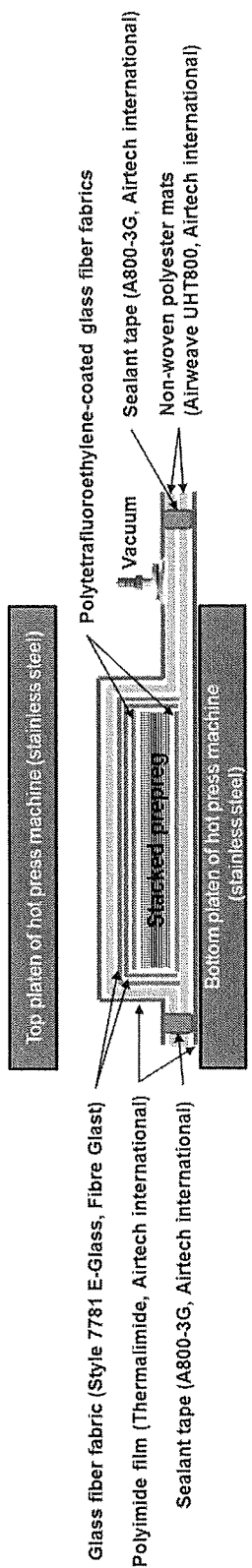
FIG. 9 depicts a cross sectional structure of bagging system for composite moldings.
Figure 10:
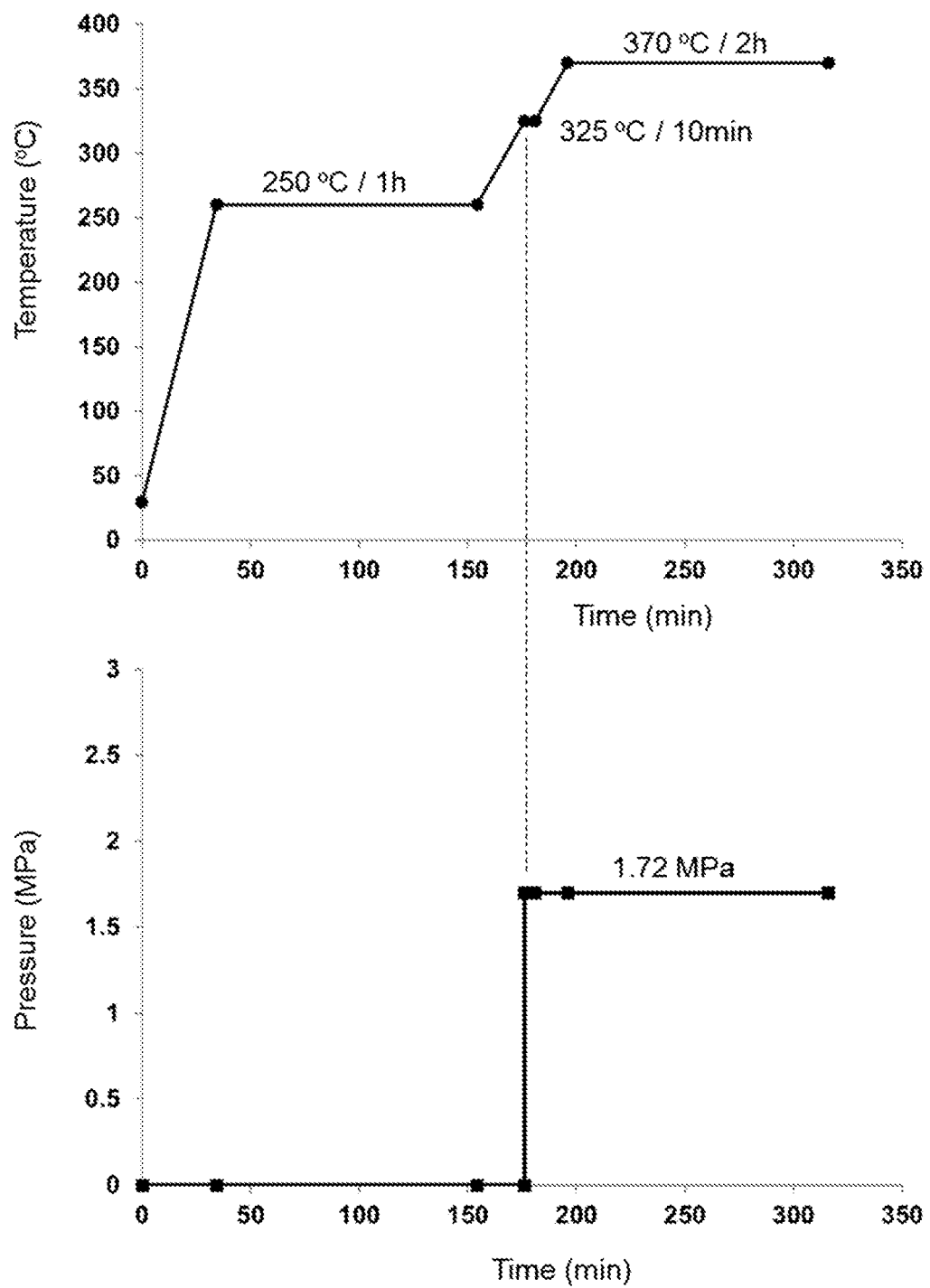
FIG. 10 depicts a graph representing the cure cycle for molding composites using a hot press machine in accordance with the present disclosure.
Figure 11:
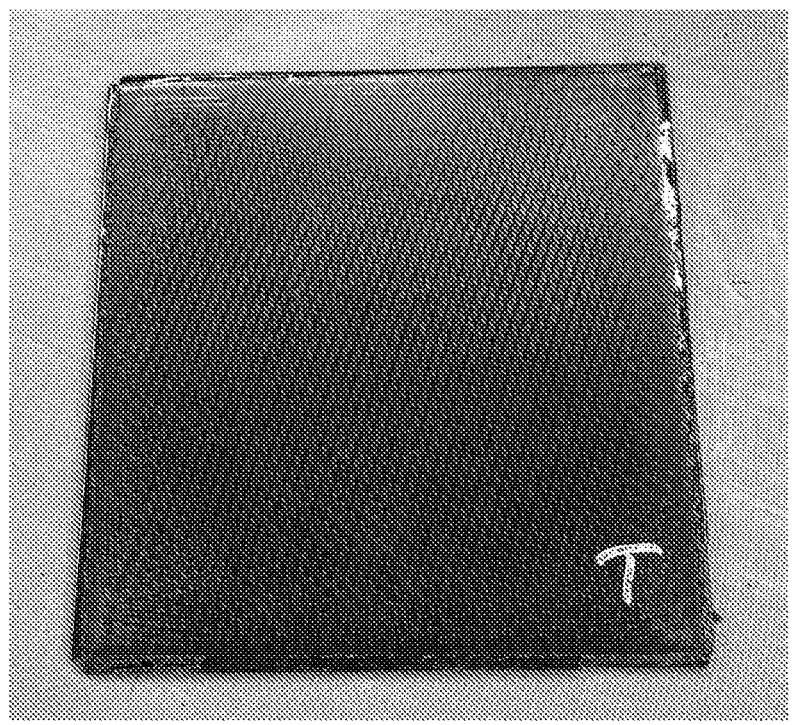
FIG. 11 is a photographical depiction of a molded composite panel in accordance with the present disclosure.
Figure 12:
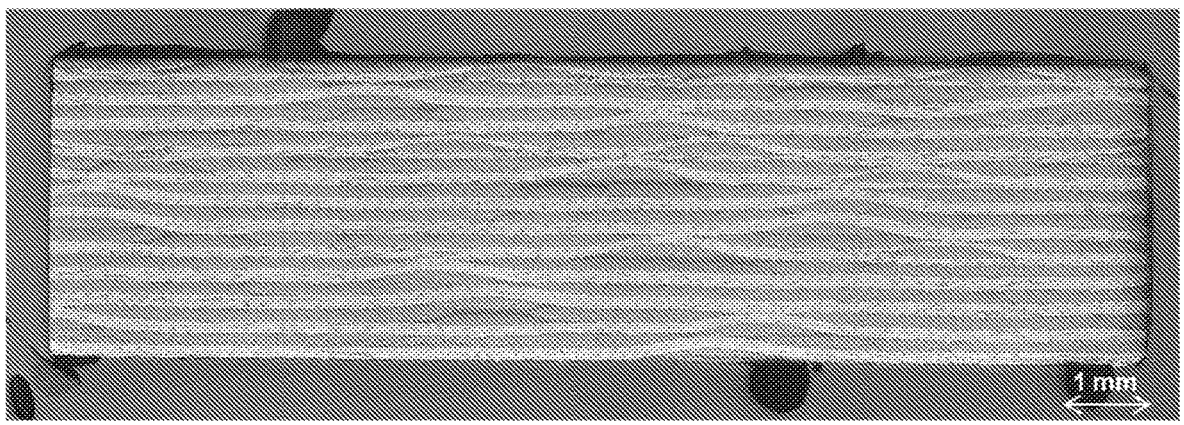
FIG. 12 is a photographical depiction of the cross section of a molded composite panel captured via an optical microscope in accordance with the present disclosure.
Figure 13:
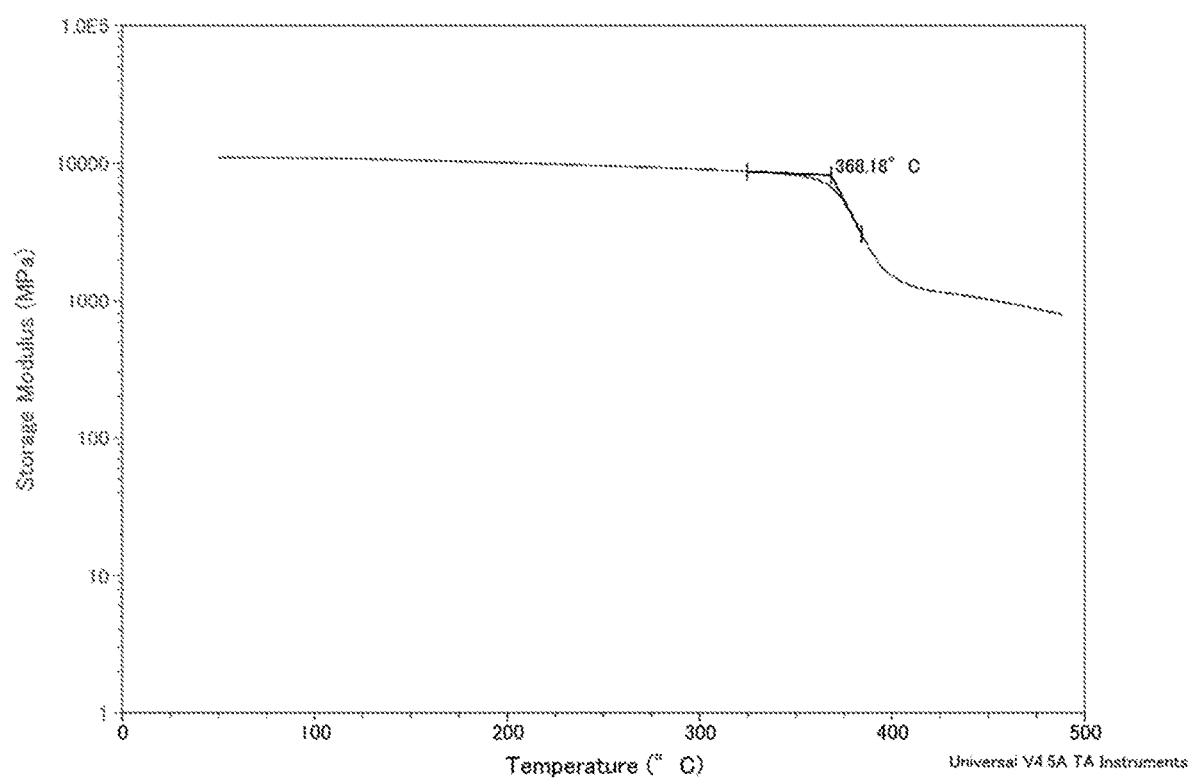
FIG. 13 depicts a graph representing typical dynamic mechanical (DMA) data of composite panel in accordance with the present disclosure.

The prepared AAO solution prepregs were stacked in a sequence and then placed with polytetrafluoroethylene-coated glass fiber fabrics, non-woven polyester mats, and glass fiber fabrics in a bag made of a polyimide film (Thermalimide manufactured by Airtech International Inc.) and a sealant tape as shown in FIG. 9. The bag including the sequence of AAO solution prepregs was placed between the stainless steel plates of a hot press machine as shown in FIG. 9. Vacuum was applied in the polyimide bag during the composite molding. The fiber-reinforced polyimide composite panels were successfully molded using the hot press machine with applying vacuum inside of the bagging system according to the molding condition shown in FIG. 10. The stacking sequence of the AAO solution prepreg was applied along with test standards of the composite panels after molding (Table 1). No surface porosities and no voids were found in the composite by cross sectional observation using a microscope after preparing specimens of mechanical tests as shown in FIGS. 11 and 12, indicating that the cured resin was well impregnated between the filaments of carbon fibers in the molded composite panel. The obtained fiber-reinforced polyimide composite had 45% of the cured resin oligomer content by volume and 55% of the carbon fiber content by volume (Vf=55%). Also, the molded composite panel showed a high DMA Tg at 367° C. (See FIG. 13). Furthermore, the fiber-reinforced polyimide composites showed a higher short beam shear strength (72 MPa).

TABLE 1

| | | Example 1 | | | | |
|---|---|---|---|---|---|---|
| | Test Temperature (°C.) | Average Dimension of Test Specimens (mm) | | | Lay-up Sequence of Prepreg | Strength (MPa) |
| | | Length | Width | Thickness | | |
| SBS | 25 | 24.0 | 9.0 | 4.5 | $[(0/90)]_{12}$ | 72 |
| | 288 | 24.0 | 9.4 | 4.6 | $[(0/90)]_{12}$ | 31 |
| Tensile | 25 | 228.5 | 25.5 | 3.1 | $[(0/90)]_{8}$ | 729 |
| Flexural | 25 | 175.0 | 13.3 | 4.5 | $[(0/90)]_{12}$ | 872 |
| Compression | 25 | 139.7 | 12.8 | 4.6 | $[(0/90)]_{12}$ | 667 |
| | 288 | 139.7 | 12.7 | 4.4 | $[(0/90)]_{12}$ | 352 |
| OHC | 25 | 76.2 | 25.5 | 6.1 | $[(+45/-45)/(0/90)/(-45/+45)/(90/0)]_{2S}$ | 274 |
| | 288 | 76.2 | 25.5 | 6.05 | $[(+45/-45)/(0/90)/(-45/+45)/(90/0)]_{2S}$ | 157 |
| CAI | 25 | 152.4 | 101.6 | 4.7 | $[(+45/-45)/(0/90)]_{3S}$ | 239 |
| | 25 | 152.4 | 101.7 | 6.1 | $[(+45/-45)/(0/90)]_{4S}$ | 248 |

Example 2

3.869 g (14 mmol) of 2-phenyl-4,4'-dianminodiphenyl ether and 5.6 g of 1,3-dioxolane and 5.6 g of methanol were added into a 50 mL three-necked flask equipped with a thermometer, a stirring bar, and a nitrogen-supplying tube. 2-phenyl-4,4'-dianminodiphenyl ether was allowed to be completely dissolved in the solvent under nitrogen flow at room temperature for 3 hours at 40° C. for 1.5 hours. 2.617 g (12 mmol) of 1,2,4,5-benzenetetracarboxylic dianhydride were added into the solution. And then 1,2,4,5-benzenetetracarboxylic dianhydride was allowed to be gradually dissolved in the solution by polymerization reaction with 2-phenyl-4,4'-dianminodiphenyl ether under nitrogen flow at room temperature at 45° C. for 6 hours to give a light yellow colored transparent amide acid oligomer solution. 0.9929 g (4 mmol) of 4-(2-phenylethynyl)phthalic anhydride was added to the reaction solution. And then the mixture was allowed to be reacted for terminal modification under nitrogen flow at room temperature for 2 hours. A brown colored transparent solution of phenylethynyl group end-terminated amide acid oligomer was obtained. The solid content of amide acid oligomer in the solution was 40 wt %. The solution in a closed vial was able to be stored in a freezer at −18° C. for more than 6 months without generating any precipitation.

The amide acid oligomer solution was poured into an aluminum tray in a vacuum oven. The solvent was removed at 50° C. in vacuum to obtain the amide acid oligomer form. The amide acid oligomer form was easily crushed to obtain the amide acid oligomer powder. The obtained amide acid oligomer was represented by General formula (1), (2), (3), or (4), in which $R_1$ and $R_2$ are each independently a 2-phenyl-4,4-diaminodiphenyl ether residue, $R_3$ and $R_4$ are each independently a 1,2,4,5-benzenetetracarboxylic dianhydride residue, and m=6 and n=0 on average.

The obtained amide acid oligomer powder was added into an aluminum tray and placed into a convection oven to be thermally treated at 250° C. for 1 hour for the imidization. The resulting yellow colored form of the corresponding imide oligomer form was obtained. The imide acid oligomer form was easily crushed to obtain the imide oligomer powder. The obtained imide oligomer was represented by General formula (5), wherein m=6 on average.

The lowest melt viscosity of the powdery imide oligomer was 1915 Pa·sec at 363° C. when measured by a rheometer.

The film-shaped cured resin (thickness: 100 μm) molded by heating the powdery imide oligomer at 370° C. by using a hot press for 1 hour showed a Tg of 347° C. (DMA). The cured resin showed a modulus of 2.9 GPa, a breaking strength of 136 MPa, and a breaking elongation of 30% by tensile test.

Example 3

3.731 g (13.5 mmol) of 2-phenyl-4,4'-dianminodiphenyl ether, 0.523 g (1.5 mmol) of 9,9-Bis(4-aminophenyl)fluorene, 11.75 g of 2-methoxyethanol were added into a 50 mL three-necked flask equipped with a thermometer, a stirring bar, and a nitrogen-supplying tube. 2-phenyl-4,4'-dianminodiphenyl ether and 9,9-Bis(4-aminophenyl)fluorene were allowed to be completely dissolved in the solvent under nitrogen flow at room temperature for 3 hours at 40° C. for 1.5 hours. 2.617 g (12 mmol) of 1,2,4,5-benzenetetracarboxylic dianhydride were added into the solution. And then 1,2,4,5-benzenetetracarboxylic dianhydride was allowed to be gradually dissolved in the solution by polymerization reaction with 2-phenyl-4,4'-dianminodiphenyl ether under nitrogen flow at room temperature at 45° C. for 6 hours to give a light yellow colored transparent amide acid oligomer solution. 1.489 g (6 mmol) of 4-(2-phenylethynyl)phthalic anhydride was added to the reaction solution. And then the mixture was allowed to be reacted for terminal modification under nitrogen flow at room temperature for 2 hours. A brown colored transparent solution of phenylethynyl group end-terminated amide acid oligomer was obtained. The solid content of amide acid oligomer in the solution was 40 wt %. The solution in a closed vial was able to be stored in a freezer at −18° C. for more than 6 months without generating any precipitation.

The amide acid oligomer solution was poured into an aluminum tray in a vacuum oven. The solvent was removed at 50° C. in vacuum to obtain the amide acid oligomer form. The amide acid oligomer form was easily crushed to obtain the amide acid oligomer powder. The obtained amide acid oligomer was represented by General formula (1), (2), (3), or (4) in which $R_1$ represents a 2-phenyl-4,4'-diaminodiphenylether residue or a 9,9-bis(4-aminophenyl)fluorene residue; $R_2$ represents a 9,9-bis(4-aminophenyl)fluorene residue; $R_3$ and $R_4$ are each independently a 1,2,4,5-benzenetetracarboxylic dianhydride residue; and m=3.6 and n=0.4 on average.

The obtained amide acid oligomer powder was added into an aluminum tray and placed into a convection oven to be thermally treated at 250° C. for 1 hour for the imidization. The resulting yellow colored form of the corresponding imide oligomer form was obtained. The amide acid oligomer form was easily crushed to obtain the imide oligomer powder. The obtained imide oligomer was represented by General formula (6), in which $R_2$ represents a 9,9-bis(4-aminophenyl)fluorene residue; and m=3.6 and n=0.4 on average.

An imide oligomer represented by General formula (6), as shown below:

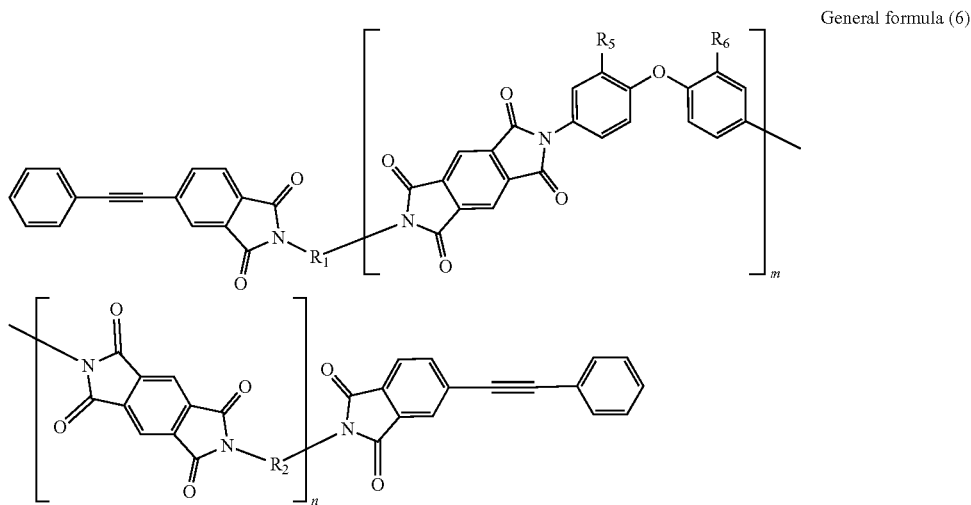

General formula (6)

wherein, $R_2$ represents a 9,9-bis(4-aminophenyl)fluorene residue, each $R_5$ and $R_6$ represents a hydrogen atom or a phenyl group and one of $R_5$ and $R_6$ being a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly.

The lowest melt viscosity of the powdery imide oligomer was 698 Pa sec at 355° C., when measured by a rheometer.

Figure 14A:
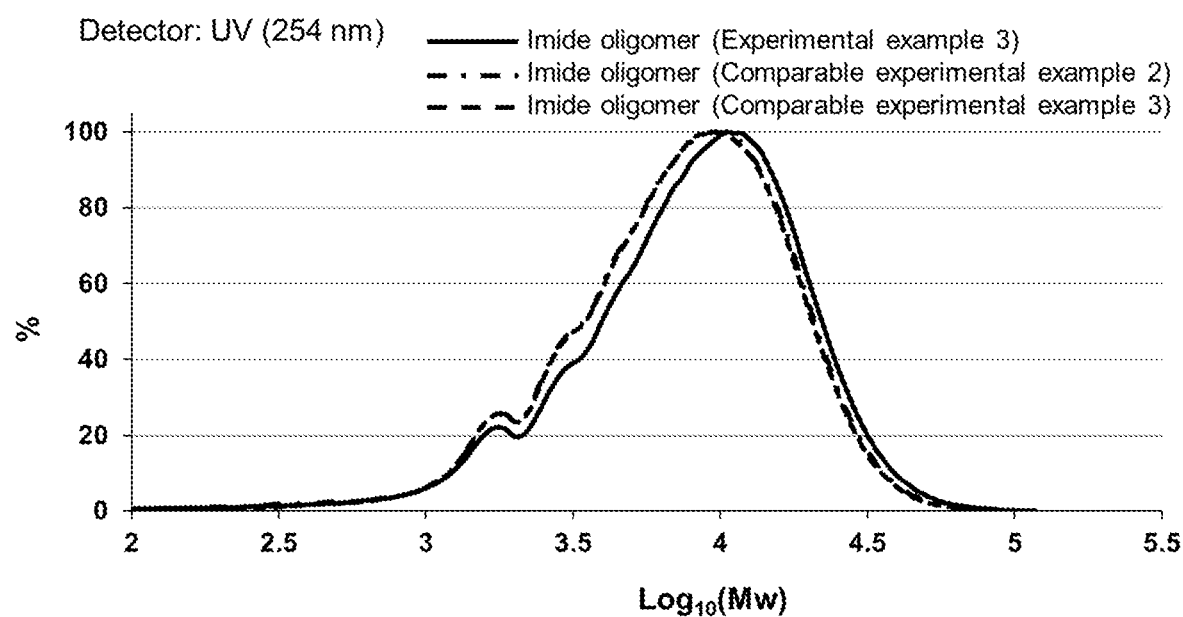
FIGS. 14A and 14B depict GPC charts of imide oligomers prepared using AAO (Example 1), PMR (Comparable Example 2) and NMP methods, respectively, which were represented by General formula (5), in which m=6 on average in accordance with the present disclosure.
Figure 14:
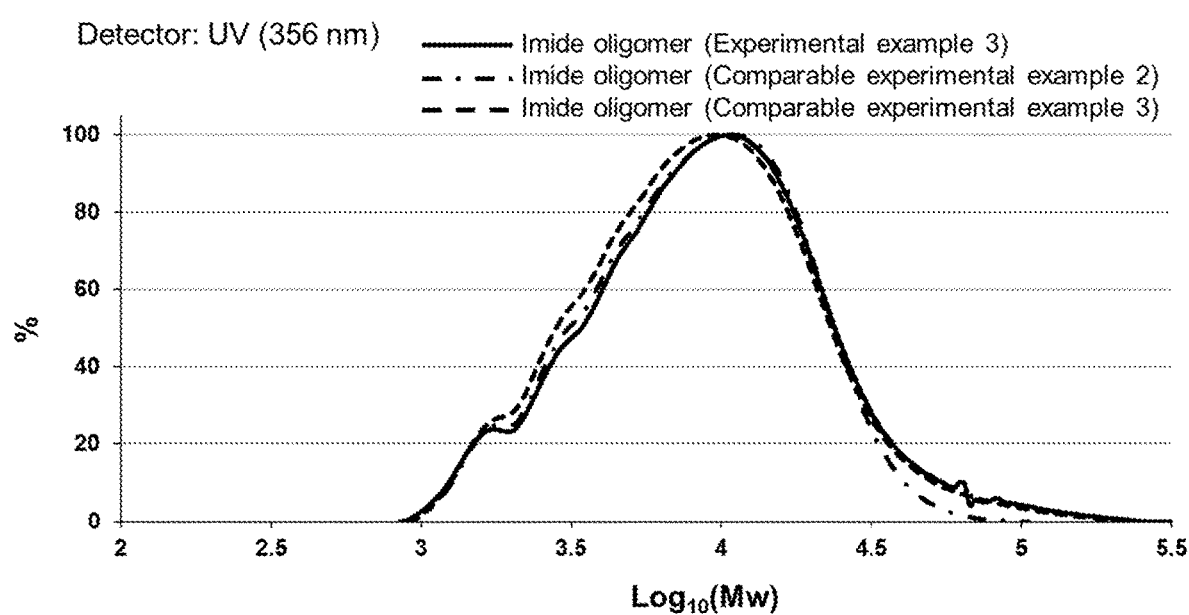

GPC data of the obtained imide oligomer are shown in FIGS. 14A and 14B. Also, imide oligomer powders obtained using a NMP solution imidization method (see Comparative example 2) and PMR method (see Comparative example 3) are shown in FIGS. 6A and 6B. Apparently, the imide oligomers obtained in this experiment were found to have fewer components having lower molecular weight in comparison with those synthesized using conventional methods.

The film-shaped cured resin (thickness: 100 μm) molded by heating the powdery imide oligomer at 370° C. by using a hot press for 1 hour showed a Tg of 373° C. (DMA). The cured resin showed a modulus of 2.0 GPa, a breaking strength of 119 MPa, and a breaking elongation of 22% by tensile test.

Comparative Example 1

1.498 g (6.0 mmol) of 4-(2-phenylethynyl)phthalic anhydride and 10.6 g of 2-methoxyethanol were added into a 100-mL sample bottle, The container was purged with nitrogen and sealed. The resulting suspension was stirred at 70° C. for 1 hour to obtain a yellow colored transparent solution. 3.948 g (18.0 mmol) of 1,2,4,5-benzenetetracarboxylic anhydride was added into the solution. The resulting suspension was stirred at 70° C. to obtain a yellow colored transparent solution. The resulting suspension was stirred at 80° C. for 6 hours and a yellow colored transparent solution was obtained. 5.835 g (18.0 mmol) of 2-phenyl-4,4'-diaminodiphenyl ether was added into the solution. The resulting suspension was stirred at 70° C. to obtain a brown colored transparent solution.

The obtained solution was added into an aluminum tray and placed into a convection oven to be thermally treated at 250° C. for 1 hour for the imidization. The resulting yellow colored form of the corresponding imide oligomer was obtained. The imide acid oligomer form was easily crushed to obtain the imide oligomer powder. The obtained imide oligomer was represented by General formula (5), wherein m=6 on average.

The lowest melt viscosity of the powdery imide oligomer was 3048 Pa sec at 361° C., when measured by a rheometer.

The film-shaped cured resin (thickness: 100 μm) molded by heating the powdery imide oligomer at 370° C. by using a hot press for 1 hour showed a Tg of 344° C. (DMA). The cured resin showed a modulus of 2.5 GPa, a breaking strength of 112 MPa, and a breaking elongation of 25% by tensile test.

Comparative Example 2

2.247 g (9.1 mmol) of 4-(2-phenylethynyl)phthalic anhydride and 10.0 g of ethanol were added into a 100-mL sample bottle, The container was purged with nitrogen and sealed. The resulting suspension was stirred at 70° C. for 1 hour to obtain a yellow colored transparent solution. 3.948 g (18.1 mmol) of 1,2,4,5-benzenetetracarboxylic anhydride was added into the solution. The resulting suspension was stirred at 70° C. to obtain a yellow colored transparent solution. The resulting suspension was stirred at 80° C. for 6 hours to obtain a yellow colored transparent solution. 5.627 g (20.4 mmol) of 2-phenyl-4,4'-diaminodiphenyl ether and 0.788 g (2.3 mmol) of 9,9-Bis(4-aminophenyl)fluorene was added into the solution. The resulting suspension was stirred at 70° C. to obtain a brown colored transparent solution.

The obtained solution was added into an aluminum tray and placed into a convection oven to be thermally treated at 250° C. for 1 hour for the imidization. The resulting yellow colored form of the corresponding imide oligomer was obtained. The imide acid oligomer form was easily crushed to obtain the imide oligomer powder. The obtained imide oligomer was represented by General formula (6), in which $R_1$ represents a 2-phenyl-4,4'-diaminodiphenylether residue or a 9,9-bis(4-aminophenyl)fluorene residue; $R_2$ represents a 9,9-bis(4-aminophenyl)fluorene residue; and m=3.6 and n=0.4 on average.

The lowest melt viscosity of the powdery imide oligomer was 94 Pa sec at 345° C., when measured by a rheometer. GPC data of the obtained imide oligomer are shown in FIGS. 13A and 13B.

The film-shaped cured product (thickness: 100 μm) was molded by heating the powdery imide oligomer at 370° C. by using a hot press for 1 hour showed a Tg of 357° C. (DMA). The cured resin showed a modulus of 3.2 GPa, a breaking strength of 137 MPa, and a breaking elongation of 20% by tensile test.

Comparative Example 3

220.79 g (0.80 mol) of 2-phenyl-4,4'-diaminodiphenylether, 30.95 g (0.089 mol) of 9,9-bis(4-aminophenyl)fluorene and 860 mL of N-methyl-2-pyrrolidone were placed and dissolved in a 2000 mL three-necked flask equipped with a thermometer, a stirring bar, and a nitrogen-supplying tube; 155.04 g (0.711 mol) of 1,2,4,5-benzenetetracarboxylic dianhydride and 33 mL of N-methyl-2-pyrrolidone were added thereto; and the mixture was allowed to react in polymerization reaction under nitrogen stream at room temperature for 2.5 hours, at 60° C. for 1.5 hours and additionally at room temperature for 1 hour, to give an amide acid oligomer. 88.22 g (0.355 mmol) of 4-(2-phenylethynyl) phthalic anhydride was added to the reaction solution; and the mixture was allowed to react for terminal modification under nitrogen stream at room temperature for 12 hours and then stirred at 195° C. for 5 hours for imidization. After cooling, part of the reaction solution was poured into 500 mL of ion-exchange water, and the precipitated powder was collected by filtration. The powder was washed with 80 mL of methanol for 30 minutes and filtered, and the powder obtained by filtration was dried under reduced pressure at 130° C. for one day, to give a product. The obtained imide oligomer was represented by General formula (5), in which $R_1$ represents a 2-phenyl-4,4'-diaminodiphenylether residue or a 9,9-bis(4-aminophenyl)fluorene residue; $R_2$ represents a 9,9-bis(4-aminophenyl)fluorene residue; and m=3.6 and n=0.4 on average.

The lowest melt viscosity of the powdery imide oligomer was 154 Pa·s (325° C.), when measured by a rheometer. GPC data of the obtained imide oligomer are shown in FIGS. 13A and 13B.

The film-shaped cured resin (thickness: 100 μm) molded by heating the powdery imide oligomer at 370° C. with a hot press for 1 hour showed a Tg of 356° C. (DMA). The cured resin showed a modulus of 3.0 GPa, a breaking strength of 119 MPa, and a breaking elongation of 13% by tensile test.

To summarize, the present disclosure describes a method comprising: dissolving an aromatic diamine and an aromatic tetracarboxylic compound in a solvent to form a mixture, wherein the solvent has a boiling point of less than 150° C.; stirring the mixture at a temperature ranging from about 5° C. to about 60° C. for about 1 hour to about 24 hours to form a reaction solution; adding unsaturated acid anhydride to the reaction solution; and stirring the reaction solution at a temperature ranging from about 5° C. to about 60° C. for about 1 minute to about 180 minutes to form an amide acid oligomer solution, the amide acid oligomer solution having the amide acid oligomer in the solvent; and/or heating the amide acid oligomer solution of claim 1 to remove the solvent; and crushing the remaining amide acid oligomer to form an amide acid oligomer powder; and/or heat treating the amide acid oligomer solution or the amide acid oligomer powder at a temperature sufficient to form a imide oligomer powder, wherein the temperature is sufficient to convert the amide acid oligomer to an imide oligomer; and/or heat treating the amide acid oligomer solution, the amide acid oligomer powder of claim 2 or the imide oligomer powder of claim 3 at a temperature of higher than 300° C. to form a cured imide resin; and/or wherein the imide oligomer is represented by General formula (5):

General formula (5)

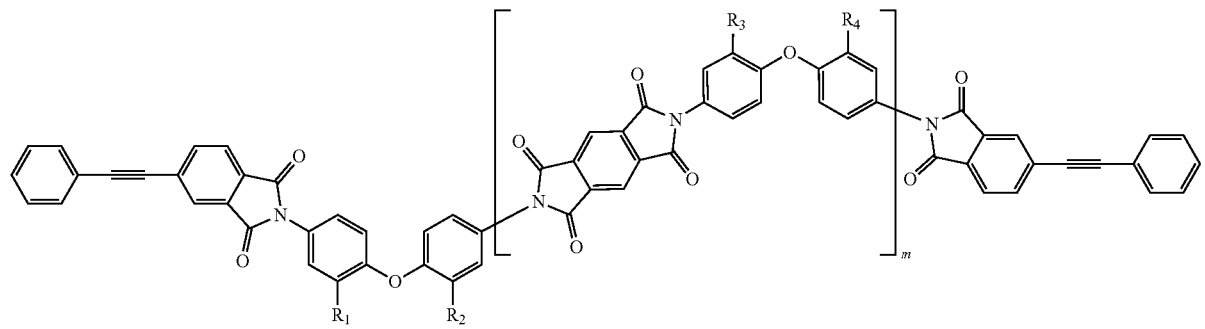

wherein each $R_1$ and $R_2$ represents a hydrogen atom or a phenyl group, where at least one of $R_1$ or $R_2$ is a phenyl group; each $R_3$ and $R_4$ also represents hydrogen atom or a phenyl group, where at least one of $R_3$ and $R_4$ is a phenyl group; and where $1 \leq m \leq 20$; and/or wherein the imide oligomer is represented by General formula (6):

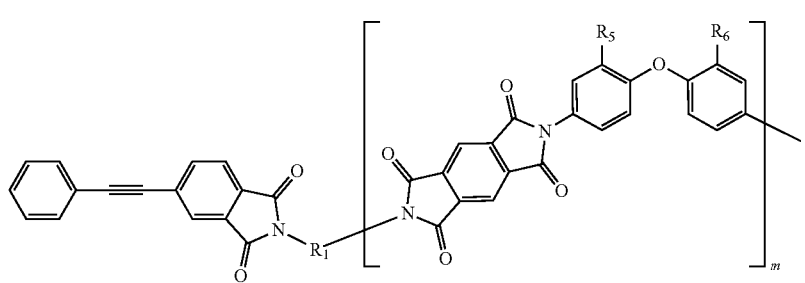

General formula (6)

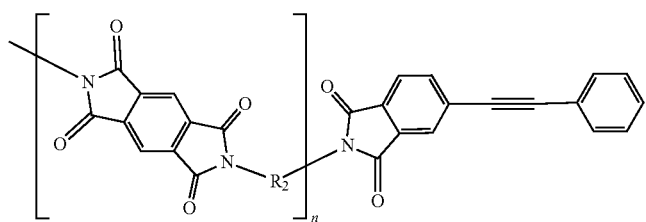

wherein each $R_1$ and $R_2$ represents bivalent aromatic diamine residue; each $R_5$ and $R_6$ represents a hydrogen atom or a phenyl group and one of $R_5$ and $R_6$ being a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly; and/or impregnating a fiber with the amide acid oligomer solution to form a prepreg; and/or thermally treating the fiber to convert the amide acid oligomer into an imide oligomer; and/or wherein the amide acid oligomer is represented by General formula (1):

wherein each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly, and the two amide linkages attached to the tetravalent aromatic tetra carboxylic acid residue represented by $R_3$ and $R_4$ can be oriented such that the two amide linkages on either side of the residue are located at the meta-position of the residue General formula (1)

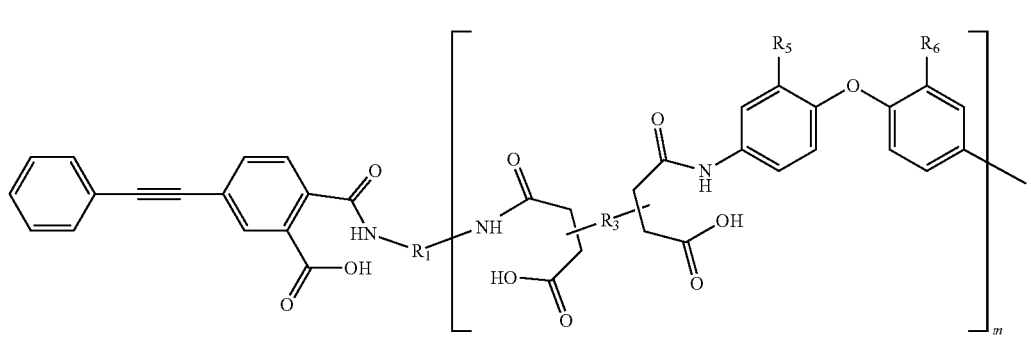

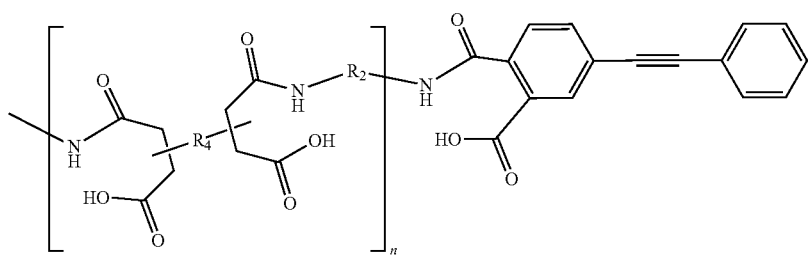

relative to each other, and/or at the para-position of the residue relative to each other; and/or wherein the amide acid oligomer is represented by General formula (2):

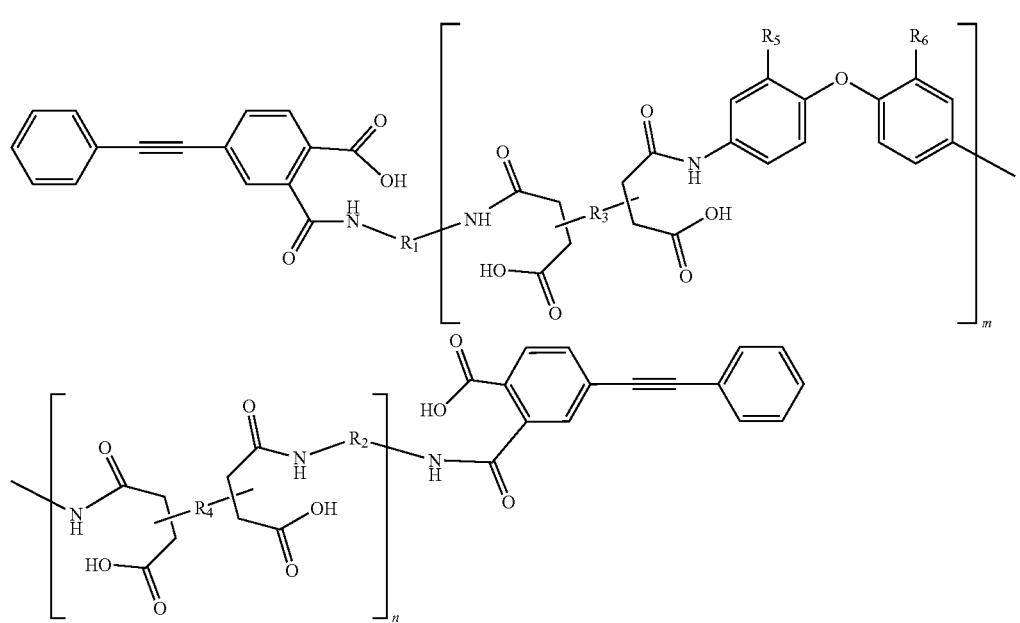

General formula (2)

wherein each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n may be arranged in blocks or randomly, and the two amide linkages attached to the tetravalent aromatic tetra carboxylic acid residue represented by $R_3$ and $R_4$ can be oriented such that the two amide linkages on either side of the residue are located at the meta-position of the residue relative to each other, and/or at the para-position of the residue relative to each other; and/or wherein the amide acid oligomer is represented by General formula (3):

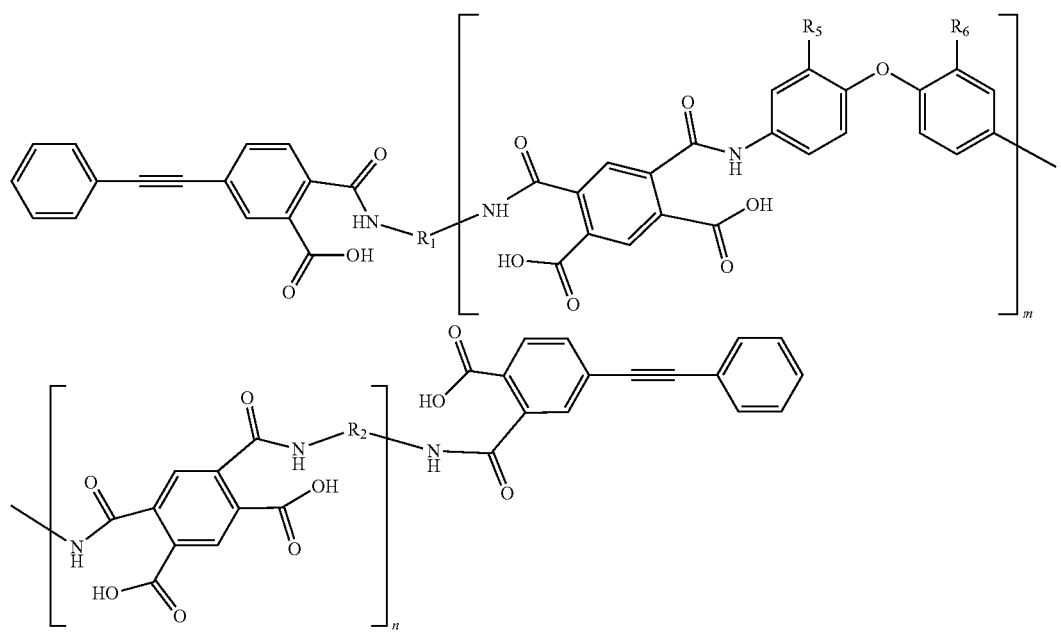

General formula (3)

wherein, each $R_1$ and $R_2$ represents bivalent aromatic diamine residue; each $R_5$ and $R_6$ represents a hydrogen atom or a phenyl group, where at least one of $R_5$ or $R_6$ is a phenyl group; m and n satisfy the following relations: m≥1, n≥0, 1≤m+n≤20, and 0.05≤m/(m+n)≤1; and the repeating units formed by m and n may be arranged in blocks or randomly; and/or wherein the amide acid oligomer is represented by General formula (4):

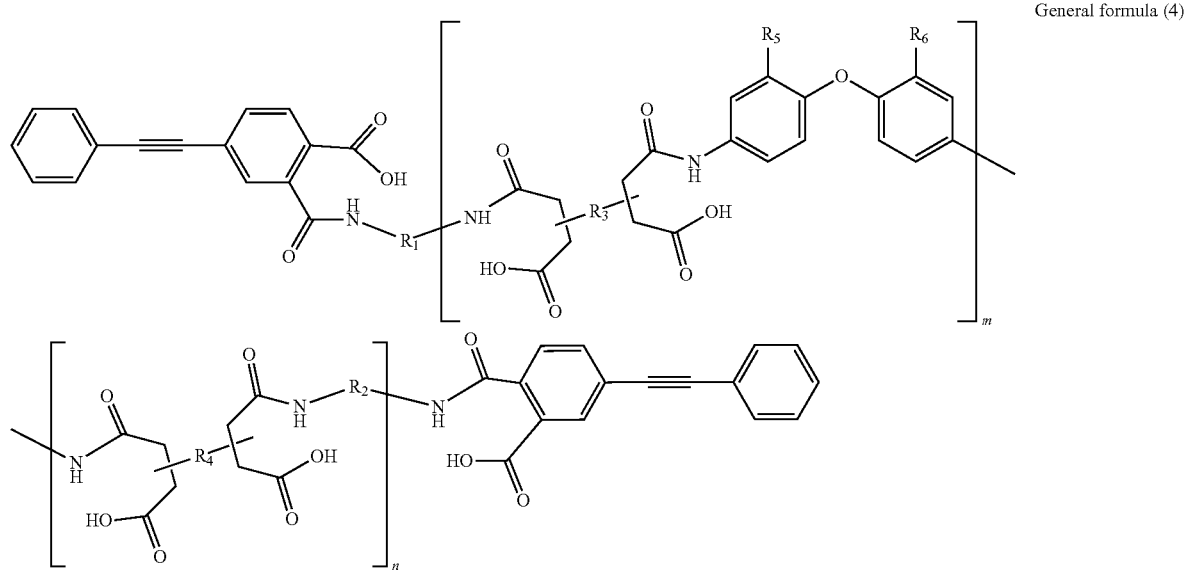

General formula (4)

wherein each $R_1$ and $R_2$ represents a bivalent aromatic diamine residue; each $R_3$ and $R_4$ represents a tetravalent aromatic tetra carboxylic acid residue; the two amide groups attached to $R_3$ and $R_4$ exist at either trans- or cis-position; each $R_5$ and $R_6$ represents a hydrogen atom or a phenyl group, where at least one of $R_5$ or $R_6$ is a phenyl group; m and n satisfy the following relations: m≥1, n≥0, 1≤m+n≤20, and 0.05≤m/(m+n)≤1; and the repeating units formed by m and n may be arranged in blocks or randomly, and the two amide linkages attached to the tetravalent aromatic tetra carboxylic acid residue represented by $R_3$ and $R_4$ can be oriented such that the two amide linkages on either side of the residue are located at the meta-position of the residue relative to each other, and/or at the para-position of the residue relative to each other; and/or wherein the solvent comprises at least one selected from the group consisting of 2-methoxyethanol, 2-ethoxyethanol, 2-methoxypropanol, or mixtures thereof; and/or wherein the solvent comprises at least one selected from the group consisting of 1,3-dioxorane, 2-methyl-1,3-dioxolane, tetrahydrofuran (THF), 1,3-dioxane, 1,4-dioxane, and mixtures thereof, and at least one selected from the group consisting of methanol, ethanol, propanol, and mixtures thereof; and/or wherein the aromatic diamine is selected from the group consisting of 2-phenyl-4,4'-diaminodiphenylether, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenylether (4,4'-ODA), 3,4'-diaminodiphenylether (3,4'-ODA), 3,3'-diaminodiphenylether, 3,3'-diaminobenzophenone, 4,4'-diaminobenzophenone, 3,3'-diaminodiphenyl- methane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl) methane, 4,4'-methylene-bis(2-ethyl-6-methylaniline), 2,2-bis(3-aminophenyl)propane, 2,2-bis(4-aminophenyl) propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl] hexafluoropropane, 9,9-bis(4-aminophenyl)fluorene, 9,9-bis (4-(4-aminophenoxy)phenyl) fluorine, and mixtures thereof; and/or wherein the aromatic tetracarboxylic compound is selected from the group consisting of 1,2,4,5-benzenetetracarboxylic acid, 3,3',4,4'-biphenyltetracarboxylic acid, bis (3,4-carboxyphenyl)ether, 1,2,4,5-benzenetetracarboxylic dianhydride, 3,3',4,4'-biphenyltetracarboxylic dianhydride, bis(3,4-carboxyphenyl) ether dianhydride, and mixtures thereof; and/or wherein the unsaturated acid anhydride is selected from the group consisting of 4-(2-phenylethynyl)phthalic anhydride, nadic anhydride, phthalic anhydride, 2-methylphthalic anhydride, and mixtures thereof.

Also described herein is an amide acid oligomer powder prepared by removing the solvent from the amide acid oligomer solution, and pulverizing the amide acid oligomer to form an amide acid oligomer powder.

Also described herein is an imide oligomer powder prepared by thermally treating the amide acid oligomer powder.

Also described herein is a cured imide resin prepared by thermally treating the amide acid oligomer powder.

Also described herein is a cured imide resin prepared by thermally treating the imide oligomer powder.

Also described herein is an amide acid oligomer powder having a complex viscosity higher than $10^4$ Pa·s over a temperature range of about 25° C. to about 250° C.

Also described herein is a fiber-reinforced composite material prepared by stacking at least one of a plurality of prepregs, a plurality of imide prepregs, or a combination of prepregs and imide prepregs, and thermally curing the stack, wherein a prepreg including a fiber impregnated by the amide acid oligomer solution, and wherein an imide prepreg is prepared by heating the prepreg to covert the amide acid oligomer into an imide oligomer.

Also described herein is a prepreg comprising a fiber impregnated by the amide acid oligomer solution.

Also described herein is an imide prepreg comprising a fiber impregnated by the amide acid oligomer solution and then heat treated to covert the amide acid oligomer into an imide oligomer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of making an amide acid oligomer solution, comprising:
dissolving an aromatic diamine and an aromatic tetracarboxylic compound in a solvent to form a mixture, wherein the solvent has a boiling point of less than 150° C.;
stirring the mixture at a temperature ranging from about 5° C. to about 60° C. for about 1 hour to about 24 hours to form a reaction solution;
adding unsaturated acid anhydride to the reaction solution; and
stirring the reaction solution at a temperature ranging from about 5° C. to about 60° C. for about 1 minute to about 180 minutes to form an amide acid oligomer solution, the amide acid oligomer solution having the amide acid oligomer in the solvent,
wherein the amide acid oligomer is represented by at least one of the following General Formulae (1)-(4):

General formula (1)

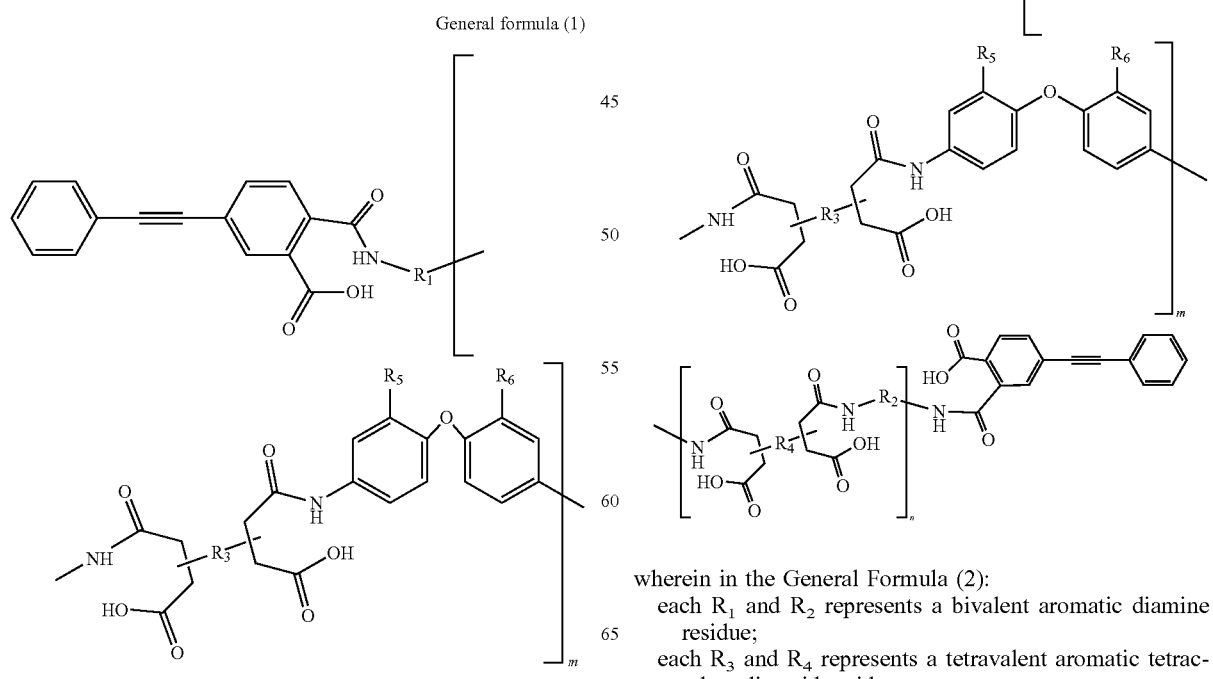

wherein in the General Formula (1):
each $R_1$ and $R_2$ represents a bivalent aromatic diamine residue;
each $R_3$ and $R_4$ represents a tetravalent aromatic tetracarboxylic acid residue;
the two amide groups attached to $R_3$ and $R_4$ exist at either trans- or cis-position;
each $R_5$ and $R_6$ represents a hydrogen atom or a phenyl group, where at least one of $R_5$ or $R_6$ is a phenyl group;
m and n satisfy the following relations: $m \geq 1$, $n \geq 0$, $1 \leq m+n \leq 20$, and $0.05 \leq m/(m+n) \leq 1$;
the repeating units formed by m and n are arranged in blocks or randomly; and
the two amide linkages attached to the tetravalent aromatic tetracarboxylic acid residue represented by $R_3$ and $R_4$ are oriented such that the two amide linkages on either side of the residue are located at the meta-position of the residue relative to each other, and/or at the para-position of the residue relative to each other;

General formula (2)

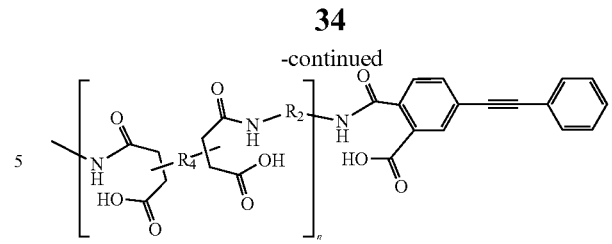

wherein in the General Formula (2):
each $R_1$ and $R_2$ represents a bivalent aromatic diamine residue;
each $R_3$ and $R_4$ represents a tetravalent aromatic tetracarboxylic acid residue;

the two amide groups attached to $R_3$ and $R_4$ exist at either trans- or cis-position;

each $R_5$ and $R_6$ represents a hydrogen atom or a phenyl group, where at least one of $R_5$ or $R_6$ is a phenyl group;

m and n satisfy the following relations: $m \geq 1$, $n \geq 0$, $1 \leq m+n \leq 20$, and $0.05 \leq m/(m+n) \leq 1$; and the repeating units formed by m and n are arranged in blocks or randomly; and the two amide linkages attached to the tetravalent aromatic tetracarboxylic acid residue represented by $R_3$ and $R_4$ are oriented such that the two amide linkages on either side of the residue are located at the meta-position of the residue relative to each other, and/or at the para-position of the residue relative to each other;

General formula (3)

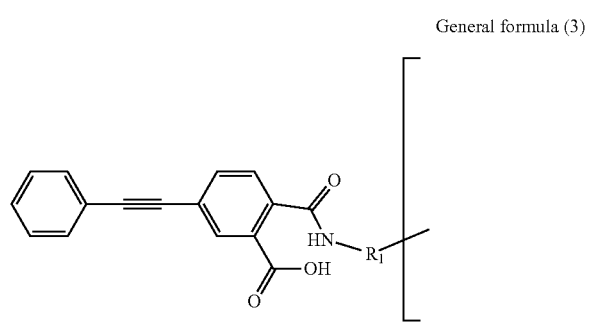

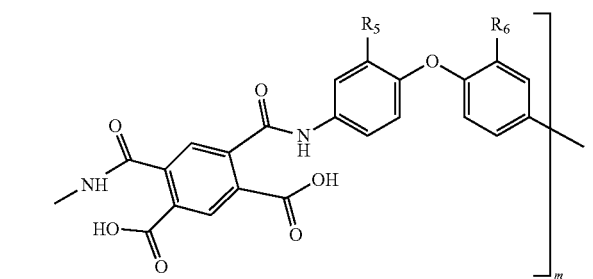

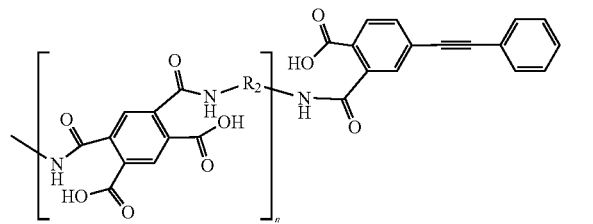

wherein in the General Formula (3), each $R_1$ and $R_2$ represents bivalent aromatic diamine residue; each $R_5$ and $R_6$ represents a hydrogen atom or a phenyl group, where at least one of $R_5$ or $R_6$ is a phenyl group; m and n satisfy the following relations: $m \geq 1$, $n \geq 0$, $1 \leq m+n \leq 20$, and $0.05 \leq m/(m+n) \leq 1$; and the repeating units formed by m and n are arranged in blocks or randomly; and General formula (4)

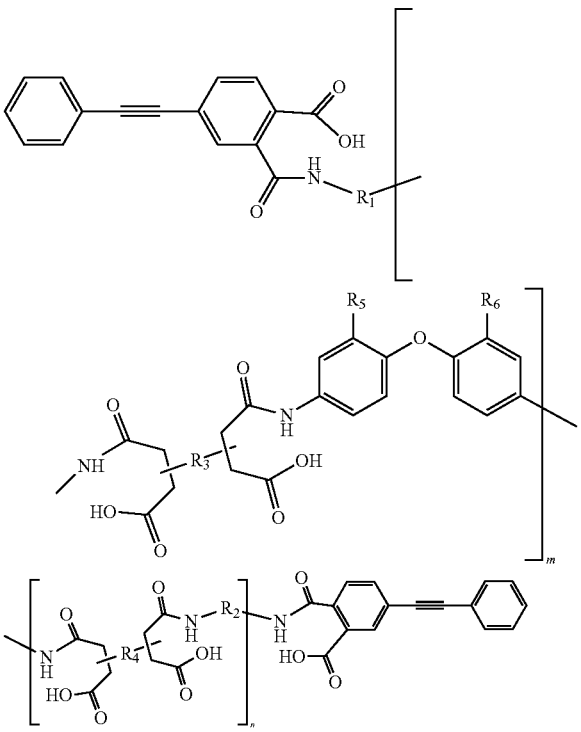

wherein in the General Formula (4):
each $R_1$ and $R_2$ represents a bivalent aromatic diamine residue;

each $R_3$ and $R_4$ represents a tetravalent aromatic tetracarboxylic acid residue;

the two amide groups attached to $R_3$ and $R_4$ exist at either trans- or cis-position;

each $R_5$ and $R_6$ represents a hydrogen atom or a phenyl group, where at least one of $R_5$ or $R_6$ is a phenyl group;

m and n satisfy the following relations: $m \geq 1$, $n \geq 0$, $1 \leq m+n \leq 20$, and $0.05 \leq m/(m+n) \leq 1$; and the repeating units formed by m and n are arranged in blocks or randomly; and the two amide linkages attached to the tetravalent aromatic tetracarboxylic acid residue represented by $R_3$ and $R_4$ are oriented such that the two amide linkages on either side of the residue are located at the meta-position of the residue relative to each other, and/or at the para-position of the residue relative to each other.

2. A method of making an amide acid oligomer powder, comprising:
producing the amide acid oligomer solution using the method of claim 1,
heating the amide acid oligomer solution to remove the solvent; and
crushing the remaining amide acid oligomer to form the amide acid oligomer powder.

3. A method of making an imide oligomer powder, comprising:
producing the amide acid oligomer solution using the method of claim 1,
heat treating the amide acid oligomer at a temperature sufficient to form the imide oligomer powder, wherein the temperature is sufficient to convert the amide acid oligomer to an imide oligomer.

4. The method of claim 3, wherein the imide oligomer is represented by General formula (5):

General formula (5)

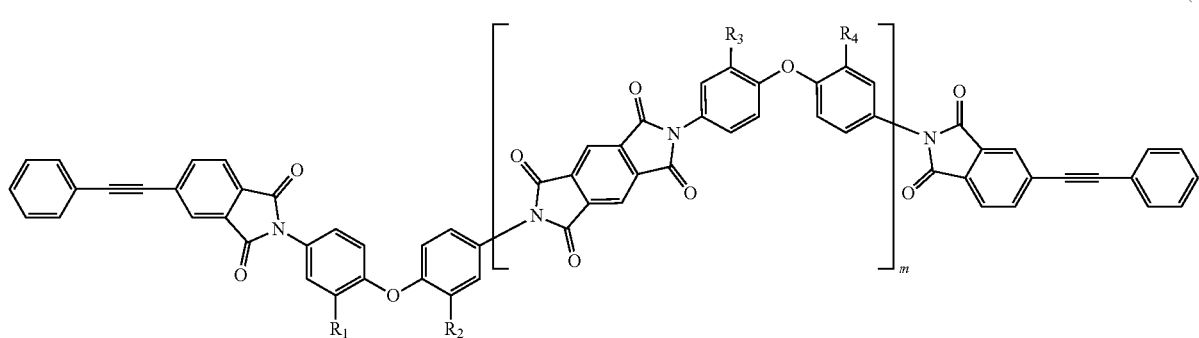

wherein:
each $R_1$ and $R_2$ represents a hydrogen atom or a phenyl group, where at least one of $R_1$ or $R_2$ is a phenyl group;
each $R_3$ and $R_4$ also represents hydrogen atom or a phenyl group, where at least one of $R_3$ and $R_4$ is a phenyl group; and
where $1 \leq m \leq 20$.

5. The method of claim 3, wherein the imide oligomer is represented by General formula (6):

General formula (6)

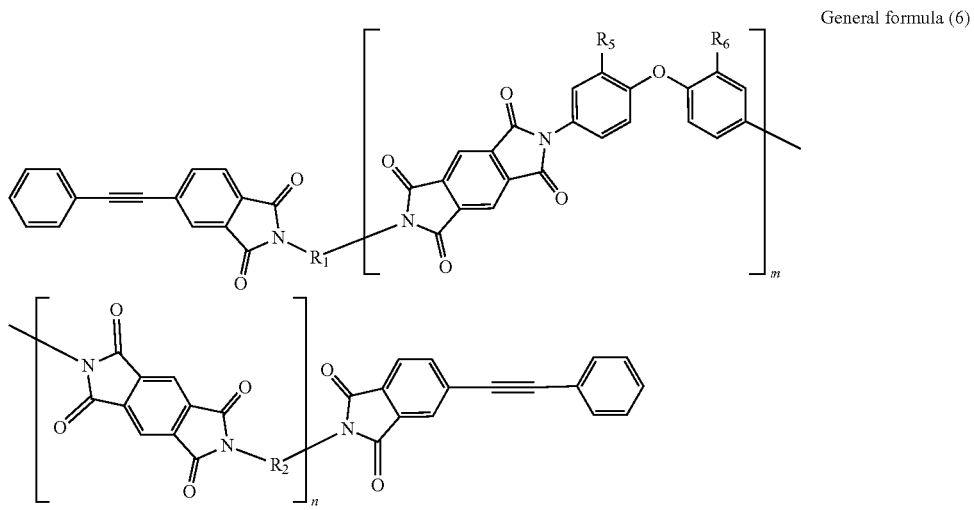

wherein:
each $R_1$ and $R_2$ represents bivalent aromatic diamine residue;
each $R_5$ and $R_6$ represents a hydrogen atom or a phenyl group and one of $R_5$ and $R_6$ being a phenyl group;
m and n satisfy the following relations: $m \geq 1$, $n \geq 0$, $1 \leq m+n \leq 20$, and $0.05 \leq m/(m+n) \leq 1$; and
the repeating units formed by m and n are arranged in blocks or randomly.

6. A method of making a cured imide resin, comprising:
producing the amide acid oligomer solution using the method of claim 1,
heat treating the amide acid oligomer solution at a temperature of higher than 300° C.

7. A method of making an imide prepreg, comprising:
producing the amide acid oligomer solution using the method of claim 1, impregnating a fiber with the amide acid oligomer solution to form the prepreg; and
thermally treating the prepreg to convert the amide acid oligomer into an imide oligomer.

8. A method of making a fiber-reinforced composite material, comprising:
producing the amide acid oligomer solution using the method of claim 1,
stacking at least one of a plurality of prepregs, a plurality of imide prepregs, or a combination of prepregs and imide prepregs to prepare a stack, and
thermally curing the stack to prepare the fiber-reinforced composite material,
wherein the prepreg includes a fiber impregnated by the amide acid oligomer solution, and
wherein the imide prepreg is prepared by heating the prepreg to covert the amide acid oligomer into an imide oligomer.

9. A method of making a prepreg comprising:
producing the amide acid oligomer solution using the method of claim 1,
impregnating a fiber impregnated with the amide acid oligomer solution.

10. The method of claim 1, wherein the solvent comprises at least one selected from the group consisting of 2-methoxyethanol, 2-ethoxyethanol, 2-methoxypropanol, or mixtures thereof, or
wherein the solvent comprises at least one selected from the group consisting of 1,3-dioxorane, 2-methyl-1,3-dioxolane, tetrahydrofuran (THF), 1,3-dioxane, 1,4-dioxane, and mixtures thereof, and
at least one selected from the group consisting of methanol, ethanol, propanol, and mixtures thereof.

11. The method of claim 1, wherein the aromatic diamine is selected from the group consisting of 2-phenyl-4,4'-diaminodiphenylether, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenylether (4,4'-ODA), 3,4'-diaminodiphenylether (3,4'-ODA), 3,3'-diaminodiphenylether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4''-aminophenoxy)phenyl]hexafluoropropane, 9,9-bis(4-aminophenyl)fluorene, 9,9-bis(4-(4-aminophenoxy)phenyl) fluorine, and mixtures thereof,
wherein the aromatic tetracarboxylic compound is selected from the group consisting of 1,2,4,5-benzenetetracarboxylic acid, 3,3',4,4'-biphenyltetracarboxylic acid, bis(3,4-carboxyphenyl)ether, 1,2,4,5-benzenetetracarboxylic dianhydride, 3,3',4,4'-biphenyltetracarboxylic dianhydride, bis(3,4-carboxyphenyl) ether dianhydride, and mixtures thereof, and
wherein the unsaturated acid anhydride is selected from the group consisting of 4-(2-phenylethynyl)phthalic anhydride, nadic anhydride, phthalic anhydride, 2-methylphthalic anhydride, and mixtures thereof.

12. An amide acid oligomer powder having a complex viscosity higher than $10^4$ Pa·s over a temperature range of about 25° C. to about 250° C.

13. An imide prepreg comprising:
a fiber impregnated by an amide acid oligomer solution including the amide acid powder of claim 12 and a solvent,
wherein the amide acid oligomer solution is thermally treated to covert the amide acid oligomer into an imide oligomer.

14. An imide oligomer powder prepared by thermally treating the amide acid oligomer powder of claim 12.

15. A cured imide resin prepared by thermally treating the imide oligomer powder of claim 14.

* * * * *